(12) United States Patent
Masaki et al.

(10) Patent No.: US 6,507,555 B1
(45) Date of Patent: *Jan. 14, 2003

(54) BALANCED DISK DRIVE APPARATUS

(75) Inventors: Kiyoshi Masaki, Amagasaki (JP); Kazuhiro Mihara, Moriguchi (JP); Shuichi Yoshida, Osaka (JP); Sachio Fukuyama, Matsuyama (JP); Noriaki Urayama, Matsuyama (JP); Masaaki Kikugawa, Matsuyama (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,350

(22) PCT Filed: Mar. 26, 1997

(86) PCT No.: PCT/JP97/01032
§ 371 (c)(1),
(2), (4) Date: Mar. 13, 1998

(87) PCT Pub. No.: WO98/03974
PCT Pub. Date: Jan. 29, 1998

(30) Foreign Application Priority Data

Jul. 19, 1996 (JP) .............................. 8-191193
Feb. 21, 1997 (JP) .............................. 9-53882

(51) Int. Cl.[7] .............................................. G11B 33/08

(52) U.S. Cl. ................................. 369/263; 360/99.08

(58) Field of Search ........................... 74/573 R, 573 F; 369/263, 270, 271; 360/99.12, 99.08, 99.04

(56) References Cited

U.S. PATENT DOCUMENTS

| | | | |
|---|---|---|---|
| 3,696,688 A | 10/1972 | Goodrich et al. | 74/573 |
| 3,733,923 A | 5/1973 | Goodrich et al. | 74/573 |
| 3,799,619 A | 3/1974 | LaBarber | |
| 3,854,347 A | 12/1974 | Hellerich | 74/573 |
| 3,918,778 A | 11/1975 | Jacobson et al. | |
| 4,060,009 A | 11/1977 | Wyman | 74/573 |
| 4,071,252 A * | 1/1978 | Gillespie | 369/263 |

(List continued on next page.)

FOREIGN PATENT DOCUMENTS

| | | | | |
|---|---|---|---|---|
| EP | 0428382 | * | 5/1991 | 369/271 |
| JP | 55142144 A | | 11/1980 | |
| JP | 61-90001 | | 11/1986 | |
| JP | 63-259242 | | 10/1988 | |
| JP | 64-3315 | | 1/1989 | |
| JP | 1-143063 | | 6/1989 | |
| JP | 1-144260 | | 6/1989 | |
| JP | 01277315 A | | 11/1989 | |
| JP | 2-139758 | | 5/1990 | |
| JP | 3-86968 | | 4/1991 | |
| JP | 3-290890 | * | 12/1991 | |
| JP | 5-144245 | | 6/1993 | |
| JP | 7-6915 | | 1/1995 | |
| JP | 8-135735 | | 5/1996 | |

OTHER PUBLICATIONS

"Transactions of the Japan Society of Mechanical", Jun., 1979.

*Primary Examiner*—Brian E. Miller
(74) *Attorney, Agent, or Firm*—Akin, Gump, Strauss, Hauer & Feld, L.L.P.

(57) ABSTRACT

A balanced disk drive apparatus for suppressing undesirable vibrations caused by the unbalance of a detachable disk during high speed data transfer comprises a balanced disk drive apparatus having a hollow ring member containing a balancing member therein to form a balancer wherein the balancer is rotatable with the detachable disk for suppressing vibrations created by the unbalanced detachable disk during high speed rotation.

9 Claims, 25 Drawing Sheets

U.S. PATENT DOCUMENTS

| | | | |
|---|---|---|---|
| 4,075,909 A | | 2/1978 | Deakin ........................ 74/573 |
| 4,203,303 A | * | 5/1980 | Miller ......................... 464/55 |
| 4,433,592 A | | 2/1984 | Tatsumi et al. ............... 74/573 |
| 4,674,356 A | | 6/1987 | Kilgore ....................... 74/573 |
| 5,006,945 A | * | 4/1991 | Furusawa ................. 360/99.12 |
| 5,111,713 A | | 5/1992 | Cameron et al. ............. 74/573 |
| 5,142,936 A | | 9/1992 | McGale ....................... 74/573 |
| 5,256,037 A | * | 10/1993 | Chatelain ................ 417/423.7 |
| 5,422,776 A | * | 6/1995 | Thorson et al. .......... 360/98.07 |
| 5,537,272 A | * | 7/1996 | Kazmierczak et al. ... 360/99.08 |
| 5,555,144 A | * | 9/1996 | Wood et al. .............. 360/98.08 |
| 5,761,186 A | * | 6/1998 | Mushika et al. ............. 369/271 |
| 5,903,540 A | * | 5/1999 | Ro et al. ..................... 369/263 |
| 6,005,749 A | * | 12/1999 | Ikuta et al. .............. 360/99.12 |
| 6,061,325 A | * | 5/2000 | Zaun .......................... 369/264 |
| 6,198,715 B1 | * | 3/2001 | Kouno et al. ................ 369/247 |

* cited by examiner (a)

(b)

BALANCED DISK DRIVE APPARATUS

TECHNICAL FIELD

The present invention relates to a disk drive apparatus that allows stable recording and playback by suppressing undesirable vibration and noise caused by the unbalance of a disk as a removable recording medium.

BACKGROUND ART

Recently, in a disk drive apparatus for driving disks as removable recording media (for example, CD-ROM), disk rotational speeds increase in order to increase data transfer speed. However, disks contain mass imbalance due to thickness nonuniformity, etc. If such disks are rotated at a high speed, a nonuniform centrifugal force (imbalance force) is exerted on the center of disk rotation, resulting in the problem that the vibration due to the imbalance force is transmitted to the entire apparatus. Since the magnitude of the imbalance force increases with the square of the rotational frequency, the vibration increase rapidly as the disk rotational speed is raised. Accordingly, rotating disks at high speed has involved the problems that noise is generated by the vibration, that the bearing of the spindle motor for driving disks is damaged, and that stable recording and playback are impossible. A further problem has been that when a disk drive apparatus is built in a computer or the like, the vibrations are transmitted to other peripheral devices, causing ill effects.

Therefore, in order to increase data transfer rates by increasing disk rotational speeds, it has been necessary to suppress undesirable vibrations caused by disk imbalance.

An example of a conventional disk drive apparatus will be described below with reference to drawing.

FIG. 24 is a perspective view showing the conventional disk drive apparatus. In FIG. 24, a disk 1 is driven for rotation by a spindle motor 2, and a head 3 reads data recorded on the disk 1 or writes data to the disk 1. A head driving mechanism 5 consists of a rack and pinion or the like, and converts the rotary motion of a head driving motor 4 into a rectilinear motion which is transmitted to the head 3. By this head driving mechanism 5, the head 3 is moved radially across the disk 1. The spindle motor 2, the head driving motor 4, and the head driving mechanism 5 are mounted on a sub-base 6. Vibration and shock transmitted to the sub-base 6 from outside the apparatus are dampened by an insulator 7 (elastic member); the sub-base 6 is mounted on a main base 8 via the insulator 7. Main part of the disk drive apparatus is constructed so that it can be mounted inside a computer apparatus or the like by using a frame 9 attached to the main base 8.

FIG. 25 is a cross-sectional side view showing the vicinity of the spindle motor 2 in the conventional disk drive apparatus. A turn table 110 is fixed to a shaft 21 of the spindle motor 2 and supports a clamp area 11 of the disk 1 in rotatable fashion. A boss 14 which engages with a clamp hole 12 in the disk 1 is formed integrally with the turn table 110. The centering of the disk 1 is achieved by engaging the disk 1 with the boss 14. In the upper part of the boss 14 is formed a positioning hole 113, and further, a counter yoke 15 is fixed.

A clamper 116 has a center projection 17 for centering, which engages with the positioning hole 113 formed in the turn table 110, and around which a ring-shaped magnet 18 is fixed. A flat contacting portion 19 which contacts the disk 1 is formed on the lower surface of the damper 116.

In the thus constructed conventional disk drive apparatus, when loading the disk 1, the disk 1 is placed on the turn table 110 with the clamp hole 12 engaging on the boss 14. At this time, the disk 1 is held in position by the attractive force acting between the magnet 18 built into the clamper 116 and the counter yoke 15 fixed to the turn table 110. The thus held disk 1 is driven for rotation by the spindle motor 2 in integral fashion with the turn table 110 and the damper 116. When removing the disk 1, the damper 116 and the turn table 110 are driven by the driving force of a disk loading motor (not shown) in such direction that both depart from each other, so that the disk 1 becomes in a state to be removable.

However, with the conventional disk drive construction described above, if the disk 1 contains mass imbalance due to thickness nonuniformity, etc., when the disk 1 is rotated at high speed a centrifugal force (imbalance force) F acts upon the center of mass, G1, of the disk 1 shown in FIG. 25. Its acting direction turns with the rotation of the disk 1. This imbalance force F is transmitted to the sub-base 6 via the turn table 110 and spindle motor 2; since the sub-base 6 is supported on the insulator 7 formed of an elastic member, the sub-base 6 wobbles greatly because of the imbalance force, while deforming the insulator 7. Since the magnitude of the imbalance force F is proportional to the product of its unbalance amount (expressed in gcm) and the square of the rotational frequency, the vibration acceleration of the sub-base 6 also increases rapidly, approximately in proportion to the square of the rotational frequency of the disk 1. As a result, noise is generated by resonances of the sub-base 6 itself and the head driving mechanism 5 mounted on the sub-base 6, and the disk 1 and the head 3 vibrate greatly, leading to the problem that stable recording and playback cannot be made.

In order to cope with this problem, in the conventional disk drive apparatus such a measure has been taken as to reduce the amplitude of vibration of the sub-base 6 by increasing the spring constant of the insulator 7 or by inserting an elastic member such as a plate spring between the sub-base 6 and the main base 8. Increasing the stiffness of the joint portion between the sub-base 6 and the main base 8, however, this measure led to the problem that when vibration or shock is applied from outside the apparatus, the vibration or shock is directly transmitted to the sub-base 6 on which the disk 1, the head 3, etc. are mounted, rendering stable recording and playback impossible and degrading the anti-vibration, anti-shock characteristics of the apparatus.

The above measure has also involved the problem that the vibration of the sub-base 6 caused by the imbalance force F is transmitted to the outside of the disk drive apparatus via the main base 8 and frame 9, causing ill effects to other devices than the disk drive apparatus, which are mounted inside the computer apparatus. Furthermore, there has arisen the problem that a large side pressure is exerted on the bearing of the spindle motor 2 by the imbalance force F, increasing bearing damaging torque and leading to damage to the bearing, eventually shortening the bearing life.

In view of the above-outlined problems, the present invention provides a disk drive apparatus that ensures stable recording or reproducing even when an unbalanced disk is rotated at high speed, and that has high reliability against shock and vibration from outside the apparatus and achieves high data transfer rates by rotating the disk at high speed.

DISCLOSURE OF INVENTION

In order to solve the above-mentioned problems, the disk drive apparatus of the present invention is constructed such that a balancer having a hollow ring member containing therein a plurality of spherical bodies or a liquid is mounted so as to be rotatable with a disk loaded into the disk drive apparatus; hereinafter, specific means will be shown.

A disk drive apparatus according to the present invention comprises:

- a sub-base to which a spindle motor for rotationally driving a loaded disk is fixed;
- a main base on which the sub-base is mounted via an elastic member; and
- a balancer mounted rotatably with the loaded disk, and having a hollow ring member containing therein a plurality of spherical bodies.

Thus, according to the disk drive apparatus of the present invention, a disk drive apparatus can be achieved that has high vibration and shock resistant characteristics and that is capable of high-speed data transfer.

A disk drive apparatus according to the present invention comprises:

- a sub-base to which a spindle motor for rotationally driving a loaded disk is fixed;
- a main base on which the sub-base is mounted via an elastic member; and
- a balancer mounted rotatably with the loaded disk, and having a hollow ring member in which a liquid is sealed.

Thus, according to the disk drive apparatus of the present invention, the vibration of the sub-base due to the unbalance of a loaded disk can be suppressed reliably.

A disk drive apparatus according to the present invention comprises:

- a sub-base to which a spindle motor for rotationally driving a loaded disk is fixed;
- a main base on which the sub-base is mounted via an elastic member; and
- a balancer having a plurality of hollow ring members and mounted rotatably with the loaded disk,
  - wherein, of the plurality of hollow ring members, at least one hollow ring member contains spherical bodies therein, and the other hollow ring member contains a liquid sealed therein.

Thus, according to the disk drive apparatus of the present invention, the vibration of the sub-base can be suppressed reliably regardless of whether a disk with a large unbalance or a disk with a small unbalance is loaded.

A disk drive apparatus according to the present invention comprises:

- a turn table for rotatably supporting a clamp area of the loaded disk; and
- a clamper, which is formed integrally with the balancer, for clamping the disk in collaboration with the turn table.

Thus, according to the disk drive apparatus of the present invention, the vibration of the sub-base due to the unbalance of a loaded disk can be suppressed.

A disk drive apparatus according to the present invention comprises:

- a turn table, which is formed integrally with the balancer, for rotatably supporting a clamp area of the loaded disk; and
- a damper for clamping the disk in collaboration with the turn table.

Thus, according to the disk drive apparatus of the present invention, the vibration of the sub-base due to the unbalance of a loaded disk can be suppressed, and stable recording or playback can be done.

In a disk drive apparatus according to the present invention, the balancer is provided in integral fashion with a rotor of the spindle motor.

Thus, according to the disk drive apparatus of the present invention, the vibration of the sub-base due to the unbalance of a loaded disk can be suppressed.

In a disk drive apparatus according to the present invention, the vibration resonance frequency of the sub-base due to deformation of the elastic member is set lower than the rotational frequency of the disk.

Thus, according to the disk drive apparatus of the present invention, a disk drive apparatus can be achieved that ensures stable recording or playback and that is capable of high-speed rotation, without degrading its anti-vibration, anti-shock characteristics.

In a disk drive apparatus according to the present invention, the primary resonance frequency of the sub-base due to deformation of the elastic member in a mechanical vibration in a direction parallel to the recording surface of the disk is set lower than the rotational frequency of the disk.

Thus, according to the disk drive apparatus of the present invention, since the vibration of the sub-base can be suppressed reliably irrespective of the magnitude of disk imbalance, a disk drive apparatus can be achieved that ensures stable recording or reproducing and that is capable of high-speed rotation, without degrading its anti-vibration, anti-shock characteristics.

In a disk drive apparatus according to the present invention, the primary resonance frequency of the sub-base due to deformation of the elastic member in a mechanical vibration in a direction parallel to the recording surface of the disk is set lower than the maximum rotational frequency of the disk.

Thus, according to the disk drive apparatus of the present invention, a disk drive apparatus can be achieved that ensures stable recording or reproducing and that is capable of high-speed rotation, without degrading its anti-vibration, anti-shock characteristics.

A disk drive apparatus according to the present invention comprises:

- a turn table, which is provided with a positioning hole engaging with a spindle shaft of the spindle motor, for rotatably supporting the clamp area of the loaded disk; and
- a clamper, which is provided with a center shaft engaging with the positioning hole, for clamping the disk in collaboration with the turn table,
  - wherein the hollow ring member is formed concentrically with a center axis of the clamper, and the balancer is formed integrally wish the clamper.

Thus, according to the disk drive apparatus of the present invention, the vibration of the sub-base can be reduced further regardless of whether a disk with a large unbalance or a disk with a small unbalance is loaded.

A disk drive apparatus according to the present invention comprises:

- a turn table, which is provided with a positioning hole engaging with a spindle shaft of the spindle motor, for rotatably supporting the clamp area of the loaded disk; and
- a clamper, which is provided with a center hole engaging with the spindle shaft, for clamping the disk in collaboration with the turn table,
  - wherein the hollow ring member is formed concentrically with a center axis of the center hole in the clamper, and the balancer is formed integrally with the clamper.

Thus, according to the disk drive apparatus of the present invention, the vibration of the sub-base can be suppressed reliably regardless of whether a disk with a large unbalance or a disk with a small unbalance is loaded.

In a disk drive apparatus according to the present invention, two kinds of spherical bodies of different materials are arranged alternately and housed in the hollow ring member.

Accordingly, the disk drive apparatus of the present invention is capable of suppressing the generation of noise from the balancer itself.

In a disk drive apparatus according to the present invention, a plurality of metal spherical bodies and plastic spherical bodies are arranged alternately and housed in the hollow ring member.

Accordingly, the disk drive apparatus of the present invention is capable of suppressing the generation of noise from the balancer itself.

A disk drive apparatus according to the present invention comprises: a balancer with magnetic spherical bodies contained in the hollow ring member; and magnetic field generating means for holding the magnetic spherical bodies by attraction.

Accordingly, the disk drive apparatus of the present invention is capable of suppressing the generation of noise from the balancer itself.

A disk drive apparatus according to the present invention comprises:
 a turn table, to which a counter yoke as a magnetic plate is fixed, for rotatably supporting the clamp area of the loaded disk; and
 a damper which has a built-in magnet for clamping the disk by an attractive force acting between the magnet and the counter yoke, and which is formed integrally with a balancer having magnetic spherical bodies contained in the hollow ring member.

Thus, according to the disk drive apparatus of the present invention, not only the vibration of the sub-base due to the unbalance of a loaded disk can be suppressed reliably, but the generation of noise from the balancer itself can also be suppressed, while keeping the number of components to a minimum.

In a disk drive apparatus according to the present invention, an elastic member is attached rigidly around the outer circumferential surface of the magnet to which the magnetic spherical bodies are made to adhere.

Accordingly, the disk drive apparatus of the present invention is capable of suppressing the generation of noise and vibration from the balancer itself.

A disk drive apparatus of the present invention is constructed such that an elastic member is attached rigidly to a back yoke which is a magnetic plate fixed to the opposite side of the magnet from the side thereof facing the counter yoke, and the magnetic spherical bodies are made to adhere to the elastic member of the back yoke.

Accordingly, the disk drive apparatus of the present invention is capable of suppressing the generation of noise and vibration from the balancer itself.

A disk drive apparatus according to the present invention comprises:
 a turn table, to which a magnet is fixed, for rotatably supporting the clamp area of the loaded disk; and
 a clamper which has a built-in counter yoke for clamping the disk by an attractive force acting between the magnet and the counter yoke, and which is formed integrally with a balancer having magnetic spherical bodies contained in the hollow ring member.

Thus, according to the disk drive apparatus of the present invention, not only the vibration of the sub-base due to the unbalance of a loaded disk can be suppressed reliably, but the generation of noise from the balancer itself can also be suppressed, while keeping the number of components to a minimum.

A disk drive apparatus according to the present invention is constructed such that an elastic member is attached rigidly to the counter yoke built into the clamper, and the magnetic spherical bodies are made to adhere to the elastic member.

Accordingly, the disk drive apparatus of the present invention is capable of suppressing the generation of noise and vibration from the balancer itself.

In a disk drive apparatus according to the present invention, the hollow ring member housing the spherical bodies is constructed from an upper case having an opening in a lower side thereof and a lower case having an opening in an upper side thereof, and a balancer is provided that has an elastic member sandwiched between an outer circumferential side wall of the upper case and an outer circumferential side wall of the lower case.

Accordingly, the disk drive apparatus of the present invention is capable of suppressing the generation of noise and vibration from the balancer itself.

In a disk drive apparatus according to the present invention, the hollow ring member housing the spherical bodies is constructed from an upper case having an opening in a lower side thereof and a lower case having an opening in an upper side thereof, and a balancer is provided that has an elastic member sandwiched between a lower end portion of an outer circumferential side wall of the upper case and a bottom upper surface of the lower case.

Accordingly, the disk drive apparatus of the present invention is capable of suppressing the generation of noise and vibration from the balancer itself.

BEST MODE FOR CARRYING OUT THE INVENTION

First Embodiment

A disk drive apparatus according to a first embodiment of the present invention will be described below with reference to accompanying drawings.

Figure 1:
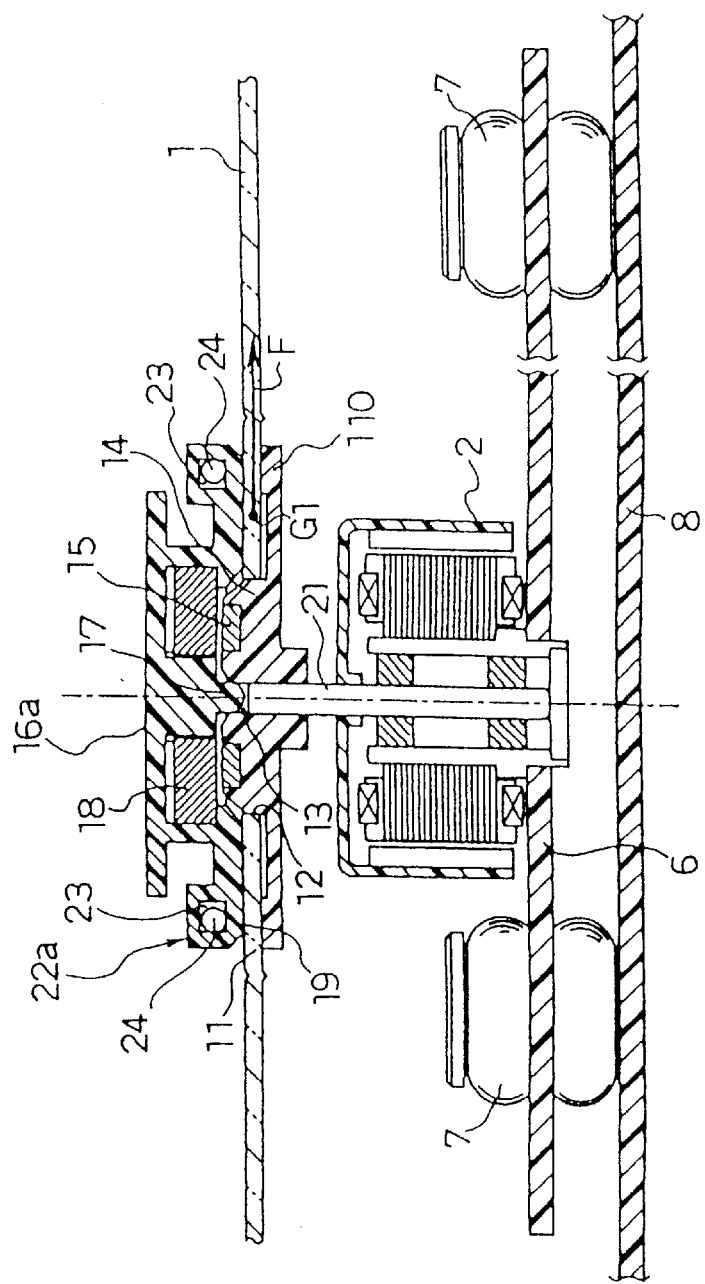
FIG. 1 is a cross-sectional side view showing the vicinity of a spindle motor 2 in a disk drive apparatus according to a fist embodiment of the present invention.
Figure 2:
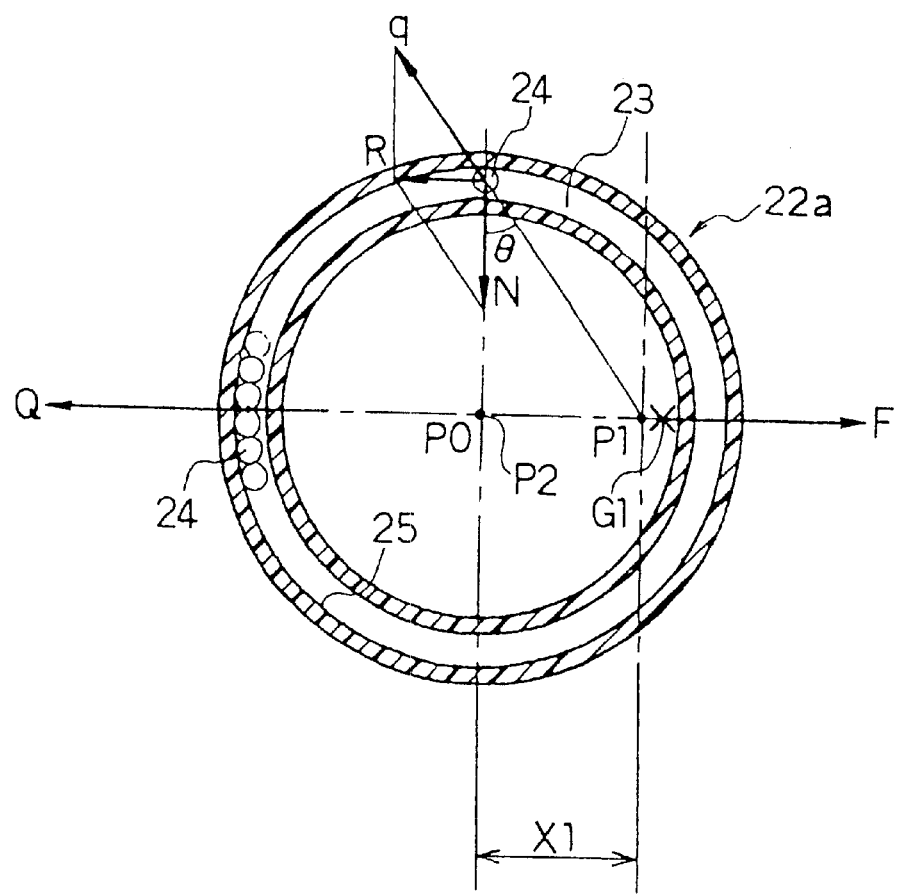
FIG. 2 is a cross-sectional plan view showing a hollow ring member 23 provided on a clamper 16a in the disk drive apparatus of the first embodiment shown in FIG. 1.
Figure 3:
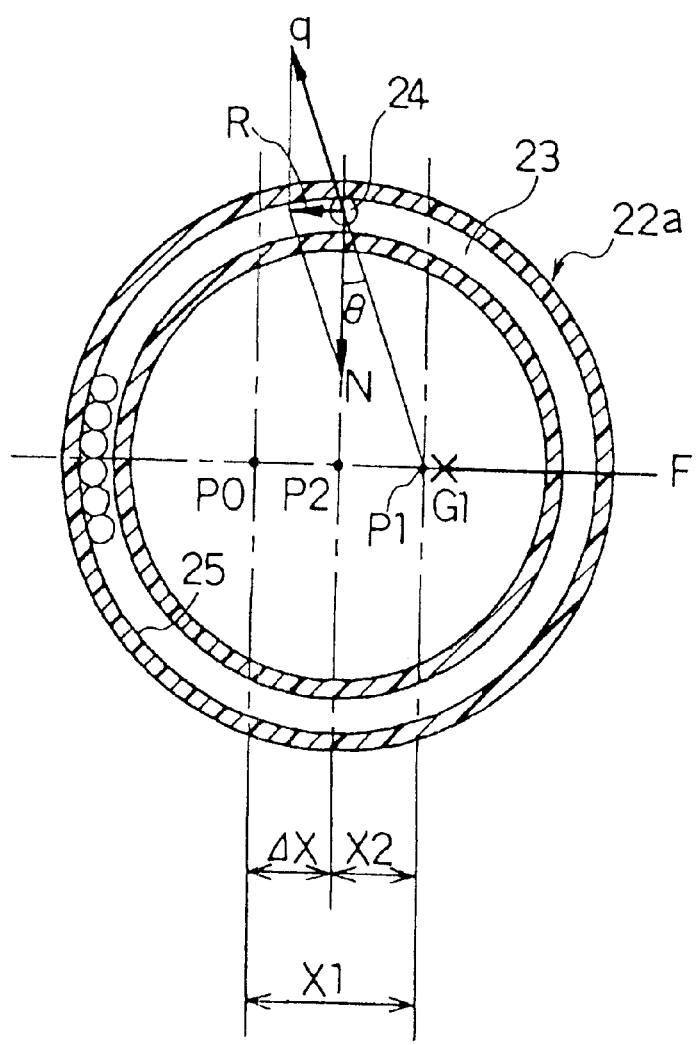
FIG. 3 is an explanatory diagram showing the case where the center axis P2 of an outer circumferential wall 25 is displaced from the rotational center axis P0 of a spindle motor.
Figure 4:
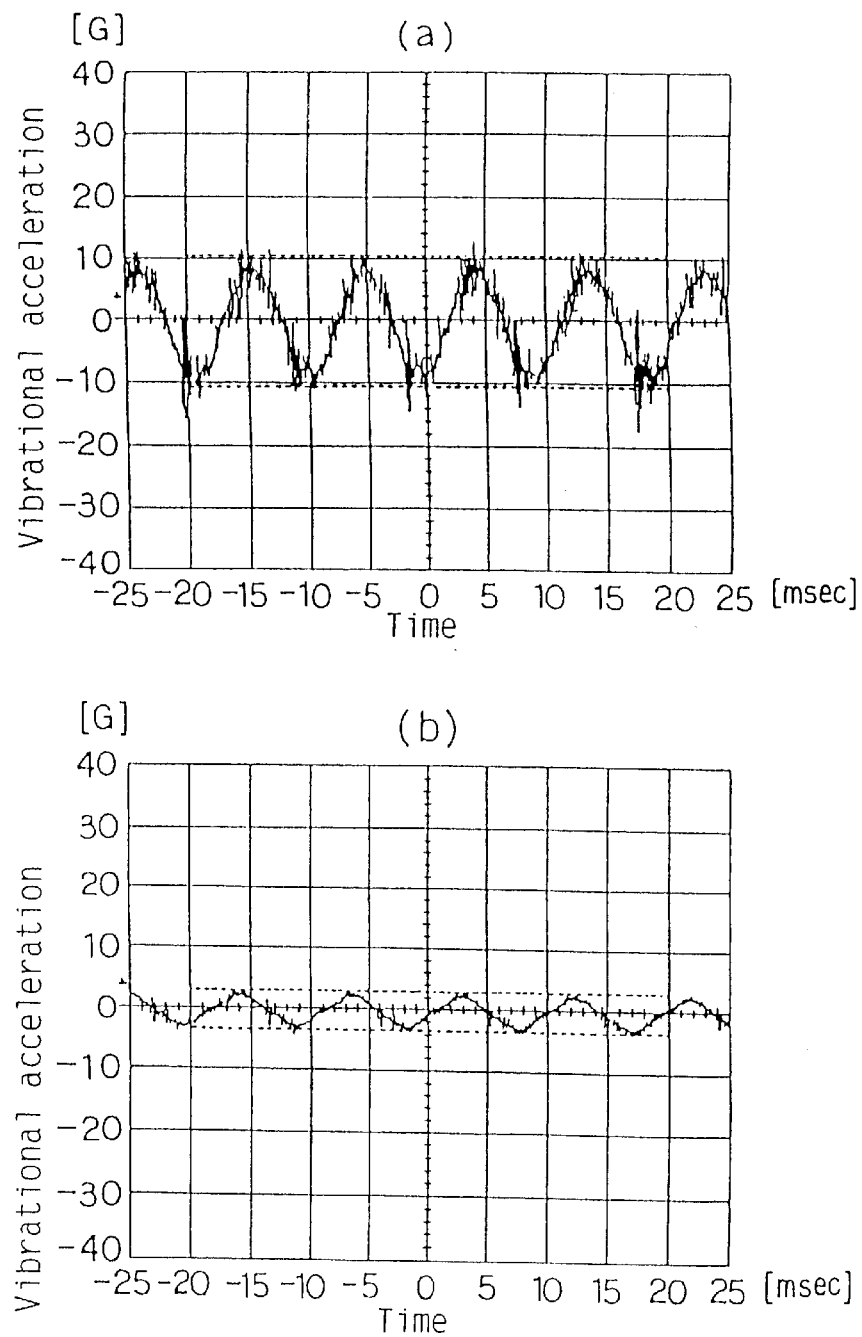
FIG. 4 shows measured values of the vibration acceleration of a sub-base 6 to illustrate the effect of the first embodiment of the present invention.
Figure 24:
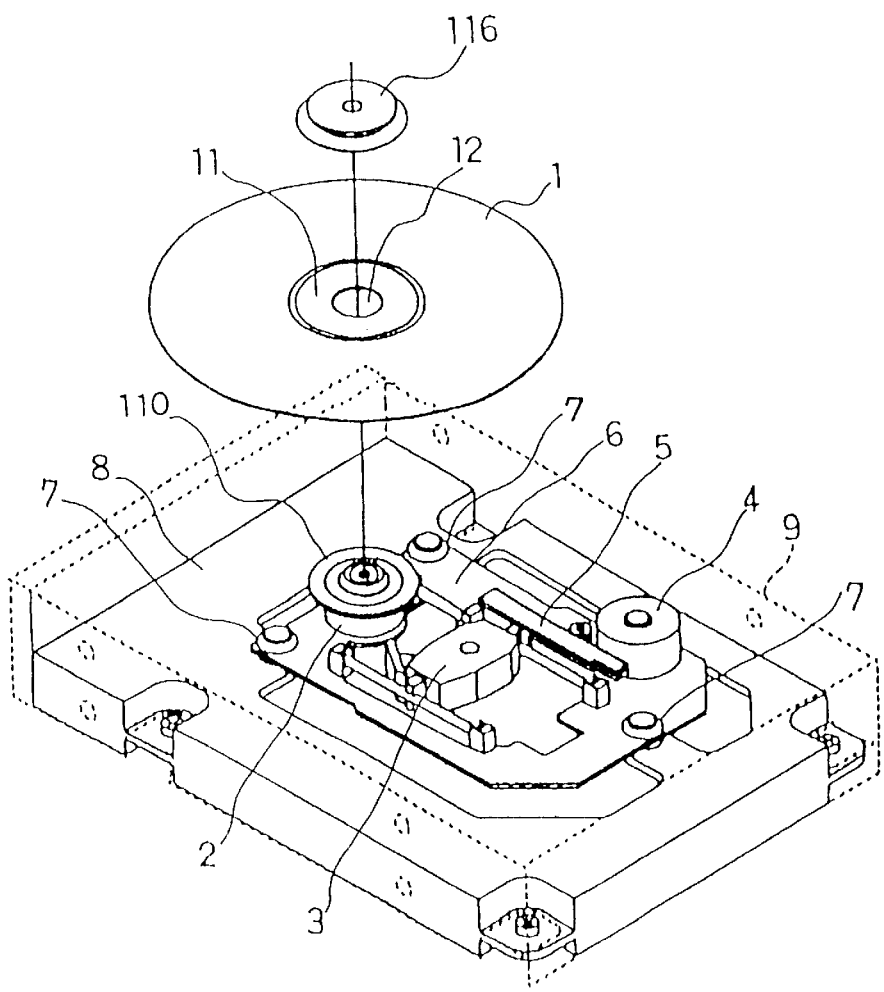
FIG. 24 is a perspective view showing a conventional disk drive apparatus.
Figure 25:
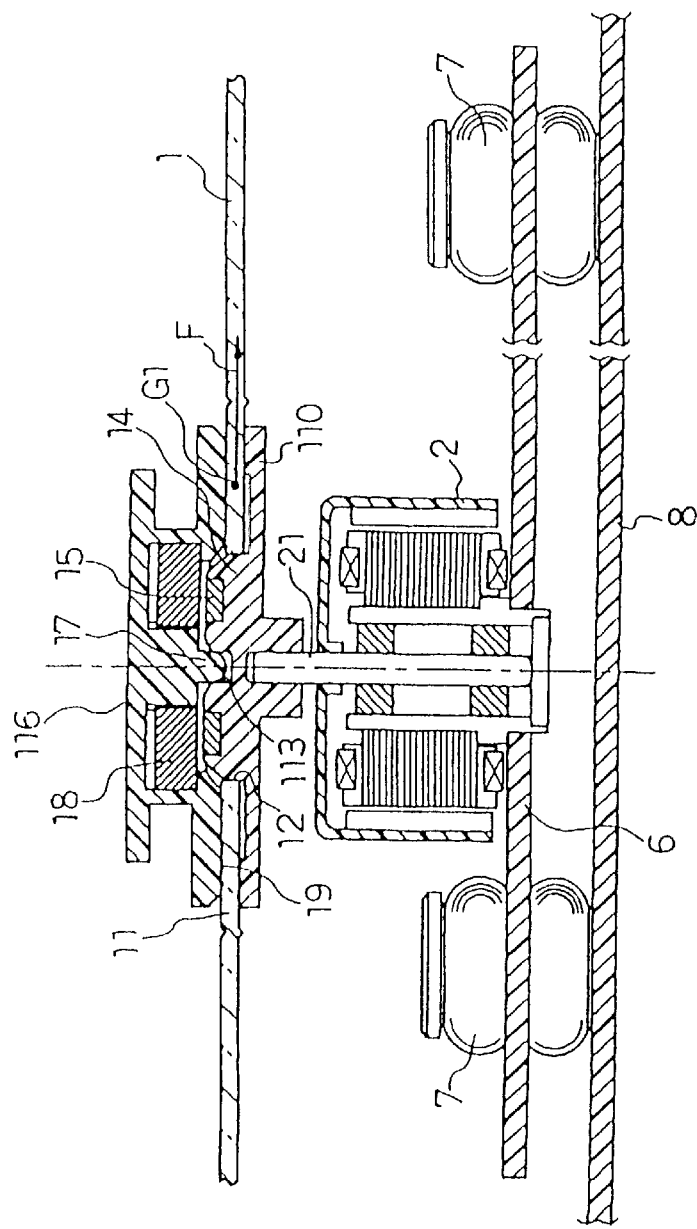
FIG. 25 is the cross-sectional side view showing the vicinity of the spindle motor 2 in the conventional disk drive apparatus.

FIG. 1 is a cross-sectional side view showing the vicinity of a spindle motor 2 in the disk drive apparatus according to the first embodiment of the present invention. FIG. 2 is a cross-sectional plan view showing only a hollow ring member 23 provided on a damper 16a according to the first embodiment of the present invention. FIG. 3 is a diagram showing the case where the center axis P2 of an outer circumferential wall 25 of the hollow ring member 23 is displaced from the rotational center axis P0 of the spindle motor. FIG. 4 shows measured values of the vibration acceleration of a sub-base 6 to illustrate the effect of the disk drive apparatus of the present invention. Here, elements essentially identical to those in the disk drive apparatus shown in FIGS. 24 and 25 are designated by the same reference numerals, and descriptions of such elements are omitted.

In FIG. 1, the disk drive apparatus of the first embodiment is constructed so that the disk 1 on the turn table 110 is clamped in a fixed position by the damper 16a and is driven for rotation by the spindle motor 2. In the disk drive apparatus, reading data recorded on the disk 1 or writing data to the disk 1 is done by means of a head. The spindle motor 2, head driving motor, head driving mechanism, etc. are mounted on a sub-base 6. Vibration and shock transmitted to the sub-base 6 from outside the apparatus are dampened by an insulator 7 (elastic member); the sub-base 6 is mounted on the main base 8 via the insulator 7. The disk drive apparatus body is constructed so that it can be mounted inside a computer apparatus or the like by using a frame attached to the main base 8.

The turn table 110 is fixed to the shaft 21 of the spindle motor 2 and supports the clamp area 11 of the disk 1 in rotatable fashion. A boss 14 which engages with the clamp hole 12 in the disk 1 is formed integrally with the turn table 110. The centering of the disk 1 is achieved with the disk 1 engaging with the boss 14. A counter yoke 15 is embedded in the upper part of the boss 14.

The damper 16a has a center projection 17 for centering, which engages with the positioning hole 13 formed in the turn table 110, and around which a ring-shaped magnet 18 is fixed. A flat contacting portion 19 that contacts the disk 1 is formed on the lower surface of the damper 16a.

In the disk drive apparatus of the first embodiment of the present invention, a spherical balancer 22a is formed on the clamper 16a. As shown in FIGS. 1 and 2, the damper 16a of the first embodiment has the center projection (center axis) 17 formed thereon for achieving positioning with respect to the turn table 110, and the hollow ring member 23 is provided concentrically with the center projection 17. Inside the hollow ring member 23 houses a plurality of spherical bodies 24 (for example, six spherical bodies) in movable fashion. The hollow ring member 23 and the spherical bodies 24 together constitute the spherical balancer 22a, and the spherical balancer 22a is formed integrally with the damper 16a.

On the other hand, the turn table 110 has the positioning hole 13, which is formed passing through the turn table 110, and the positioning hole 13 is engaged with the spindle shaft 21 which serves as the rotational center axis P0 of the spindle motor 2. Therefore, the turn table 110 is fixed to the spindle shaft 21 so that the turn table 110 rotates in integral fashion with the spindle motor 2.

When the disk 1 is clamped by the clamper 16a, the disk 1 is held on the turn table 110 with the clamp hole 12 engaging on the boss 14, as in the case of the conventional disk drive apparatus previously shown in FIG. 25. Then, the disk 1 is clamped and held in position by the attractive force acting between the magnet 18 fixed to the clamper 16a and the counter yoke 15 fixed to the turn table 110. At this time, since positioning is achieved with the center projection (center axis) 17 formed on the damper 16a engaging with the positioning hole 13 formed in the turn table 110, the hollow ring member 23 provided concentrically with the center projection (center axis) 17 is positioned substantially coaxial with the rotational center axis P0 of the spindle motor 2. The damper 16a is then driven for rotation by the spindle motor 2 in integral fashion with the disk 1 and the turn table 110. When removing the disk 1, the damper 16a and the turn table 110 are driven in directions that separate one from the other by the driving force of a disk loading motor (not shown), thus allowing the disk 1 to be removed.

Further, in the disk drive apparatus of the first embodiment, the insulator (elastic member) 7 having low stiffness is used to join the sub-base 6 to the main base 8, and the primary resonance frequency in a direction parallel to the recording surface of the disk 1 in the mechanical vibration of the sub-base 6 due to deformation of the insulator 7, is set lower than the rotational frequency of the disk 1. More specifically, the rotational frequency of the disk 1 is about 100 Hz, and the primary resonance frequency of the vibration of the sub-base 6 is set at about 60 Hz for both the direction in which the head is driven by the head driving mechanism (the access direction) and the direction at right angles to it.

Operation will be described below with reference to FIGS. 1 and 2 when a disk 1 with a large unbalance amount is rotated at 100 Hz in the thus constructed disk drive apparatus of the first embodiment of the present invention.

First, in the disk 1, a centrifugal force (called the imbalance force) F acts on its center of mass G1, and its acting direction turns with the rotation of the disk 1. The insulator 7 is deformed by the imbalance force F, and the sub-base 6 and the entire component assembly mounted on the sub-base 6 wobble at the rotational frequency of the disk 1. Here, the resonance frequency (about 60 Hz) of the sub-base 6 due to the deformation of the insulator 7 is set lower than the rotational frequency (about 100 Hz) of the disk 1. As a result, the displacing direction of the sub-base 6 is always substantially opposite to the acting direction of the imbalance force F. Consequently, the wobbling center axis P1 of the disk 1 rotating above the sub-base 6, the center of mass, G1, of the disk 1 upon which the imbalance force F is acting, and the rotational center axis P0 of the spindle motor are all arranged substantially in a straight line, as shown in FIG. 2, with both the wobbling center axis P1 of the disk 1 and the center of mass, G1, of the disk 1 positioned on the same side with respect to the rotational center axis P0 of the spindle motor.

In the above condition, since the hollow ring member 23 provided on the damper 16a is positioned with its center aligned with the rotational center axis P0 of the spindle motor 2, the center of the hollow ring member 23, that is the center P2 of the outer circumferential wall 25, coincides with the rotational center axis P0 of the spindle motor 2, and the hollow ring member 23 wobbles about the wobbling center axis P1.

At this time, each spherical body 24 housed in the hollow ring member 23 is acted upon by a centrifugal force q directed in the direction joining the wobbling center axis P1 to the center of mass of the spherical body 24. Further, since the movement of each spherical body 24 is limited by the outer circumferential wall 25 of the hollow ring member 23, a reaction N from the outer circumferential wall 25 is exerted on the spherical body 24. The reaction N from the outer circumferential wall 25 is acting in the direction toward the center P2 of the outer circumferential wall 25. As a result, a moving force R, which is the resultant force of the centrifugal force q and reaction N, acts on each spherical body 24 in the direction of a tangent line to a circle having its center at the center P2 of the outer circumferential wall 25 and passing through the center of mass of the spherical body 24, and in the direction moving away from the wobbling center axis P1. With this moving force R, the spherical bodies 24 move along the outer circumferential wall 25 and cluster in a position substantially diametrically opposite the center of mass G1 of the disk 1 across the wobbling center axis P1.

As a result, a centrifugal force Q acting on the whole cluster of spherical bodies 24 is almost opposite in direction to the imbalance force F acting on the center of mass G of the disk 1, so that the imbalance force F is offset by the centrifugal force Q and the force acting on the sub-base 6 is reduced. The vibration generated in the sub-base 6 when the unbalanced disk 1 is rotated is thus suppressed.

Further, in case of the hollow ring member 23 is provided on the damper 16a as in the first embodiment, since the space above the disk 1 is utilized where there are few other component elements around it, the hollow ring member 23 can be formed larger in diameter to allow the mass per spherical body 24 or the number of spherical bodies 24 to be increased; as a result of this is that vibrations can be suppressed sufficiently for a disk having a larger unbalance amount.

In the first embodiment, the primary resonance frequency in the direction parallel to the recording surface of the disk 1 in the mechanical vibration of the sub-base 6 due to the deformation of the insulator 7, is set lower than the rotational frequency of the disk 1. This is done so that the direction of the vibrational displacement of the disk 1 due to the imbalance force becomes substantially opposite to the acting direction of the imbalance force.

Generally, in a mechanical vibration system consisting of a spring and mass, a phase shift begins to occur near its resonance frequency, between the frequency of an external force acting on the mass and the frequency of the displacement due to the external force. At a frequency sufficiently higher than the resonance frequency, the phase shift is nearly 180 degrees in terms of electrical angle, at which the acting direction of the external force is opposite to the direction of the displacement. That is, when the resonance frequency of the sub-base 6 is set lower than the rotational frequency of the disk 1 and at such a frequency that the direction of the vibrational displacement due to the imbalance force becomes nearly opposite to the acting direction of the imbalance force, the spherical bodies 24 cluster in a position substantially diametrically opposite the center of mass G1 of the disk 1, and the acting direction of the centrifugal force Q acting on the spherical bodies 24 becomes substantially opposite to the acting direction of the imbalance force, as already mentioned. Accordingly, it is desirable that the resonance frequency of the sub-base 6 be set by considering the direction of the vibrational displacement due to the imbalance force of the rotational frequency of the disk 1.

Next, we will discuss how the resonance frequency of the sub-base 6 is set in a disk drive apparatus designed to record or reproduce with constant linear velocity, that is, by varying the rotational frequency between the inner and outer circumferences of a disk, or in a disk drive apparatus designed to record or reproduce with constant angular velocity but to rotate disks not at a single rotational frequency but at a plurality of rotational frequencies.

Vibration and noise due to the unbalance of the disk 1 increase with increasing rotational frequency of the disk 1. Therefore, a sufficient effect cannot be obtained by the spherical balancer 22a in the first embodiment unless the resonance frequency of the sub-base 6 is set at least lower than the maximum rotational frequency of the disk 1.

Further, the resonance frequency of the sub-base 6 need not be set unnecessarily lower than the rotational frequency when vibration is small and does not affect the operation of the disk drive apparatus or when noise is sufficiently suppressed, but it is desirable that the resonance frequency be set sufficiently lower than the rotational frequency (for example, 100 Hz) at which the vibration and noise due to the imbalance force begin to cause problems.

In the first embodiment of the present invention, the direction of the vibrational displacement of the disk 1 due to the imbalance force is set nearly opposite to the acting direction of the imbalance force by setting the primary resonance frequency of the sub-base 6 due to the deformation of the insulator (elastic member) 7 lower than the rotational frequency of the disk 1, as previously described. Theoretically, the direction of the vibrational displacement of the disk 1 due to the imbalance force can be set nearly opposite to the acting direction of the imbalance force by setting the primary resonance frequency (critical speed) of the flexural vibration caused in the spindle shaft by the imbalance force lower than the rotational frequency of the disk 1. However, if the primary resonance frequency of the flexural vibration of the spindle shaft is to be set lower than the rotational frequency (for example, 100 Hz) at which the vibration and noise due to the imbalance force begin to cause problems, the stiffness of the spindle shaft will have to be set lower than the level required in the disk drive apparatus, and it will pose a problem if the disk drive apparatus is to be driven for rotation by such a spindle shaft. When a spindle shaft with low stiffness is used, trouble will occur, for example, with the torsional vibration generated in the spindle shaft exciting the resonance of the disk 1.

On the other hand, in the first embodiment of the present invention, since the primary resonance frequency of the sub-base 6 due to the deformation of the insulator (elastic member) 7 is set lower than the rotational frequency of the disk 1, as previously mentioned, the direction of the vibrational displacement of the disk 1 due to the imbalance force can be set nearly opposite to the acting direction of the imbalance force. Accordingly, the vibration suppressing effect of the spherical balancer 22a can be fully displayed without reducing the stiffness of the spindle shaft 21.

In the first embodiment of the present invention, positioning is achieved by engaging the center projection (center axis) 17 provided on the damper 16a with the hole in which the spindle shaft 21 of the spindle motor 2 is fitted, that is, the same hole as the positioning hole 13. As a result, in the disk drive apparatus of the first embodiment, the center of the hollow ring member 23 formed concentrically with the center projection (center axis) of the damper 16a coincides with the rotational center axis P0 of the spindle motor 2; as a result, the spherical bodies 24 cluster in the position diametrically opposite the center of mass G1 of the disk 1, and the vibration suppressing effect can thus be increased.

As in the conventional disk drive apparatus previously shown in FIG. 24, if the hole engaged with the damper 116 is different from the hole in which the spindle shaft 21 is rigidly supported, or if the construction is such that the positioning is achieved by engaging a tapered portion provided on the turntable 110 with a tapered portion provided on the damper 116, the positional displacement between the center of the hollow ring member and the rotational center axis P0 of the spindle motor 2 may further increase due to the effects of the displacement between the axes of the holes, dimensional errors of the tapered portions, etc. If the hollow ring member 23 of the present embodiment is provided on the damper of such a disk drive apparatus, the following problem will arise.

Referring to FIGS. 2 and 3, operation will be described when the center of the hollow ring member 23, that is, the center P2 of the outer circumferential wall 25, is displaced from the rotational center axis P0 of the spindle motor 2.

FIG. 2 showed the case where the center axis P2 of the outer circumferential wall 25 coincides with the rotational center axis P0 of the spindle motor; on the other hand, FIG. 3 shows the case where there is a displacement between their positions. In FIG. 2, wobbling motion is performed with the center P2 of the outer circumferential wall 25 maintained at the same position as the rotational center axis P0 of the spindle motor 2, the center P2 of the outer circumferential wall 25 wobbling about the center axis P1 with a radius X1.

In FIG. 3, the center P2 of the outer circumferential wall 25 is located at a position displaced by $\Delta X$ from the rotational center axis P0 of the spindle motor 2, so that the center P2 of the outer circumferential wall 25 wobbles with a radius X2. In this condition, when the mass of the spherical body 24 remains the same the moving force R acting on each spherical body 24 increases as the angle $\theta$ between the direction of the centrifugal force q acting on the spherical body 24 and the direction of the reaction N from the outer circumferential wall 25 increases, and the angle $\theta$ increases as the rotational radius X2 of the wobbling motion increases. Quantitatively, the magnitude of the moving force R is proportional to the product of the rotational radius X2 of the wobbling motion and the rotational frequency. Therefore, the moving force R is reduced when the rotational radius of the wobbling motion is reduced with the center axis P2 of the outer circumferential wall 25 displaced by $\Delta X$ from the rotational center axis P0 of the spindle motor, as shown in FIG. 3. When the moving force R is reduced, the movement of the spherical bodies 24 is obstructed because of the frictional resistance and rolling resistance along the outer circumferential wall 25 and the bottom surface of the hollow ring member 23, leading to a phenomenon in which the spherical bodies 24 do not cluster in the position diametrically opposite the center of mass, G1, of the disk 1. As described above, when the positional displacement between the center of the hollow ring member 23 and the rotational center axis P0 of the spindle motor 2 is large, the vibration suppressing effect of the spherical bodies 24 is reduced.

To address this problem, the first embodiment of the present invention is constructed so that the positioning of the damper 16a is achieved by engaging the center projection (center axis) 17 provided on the damper 16a with the hole in which the spindle shaft 21 of the spindle motor 2 is fitted, that is, the same hole as the positioning hole 13. This construction, therefore, substantially prevents a positional displacement from occurring between the center of the hollow ring member 23 formed concentrically with the center projection (center axis) 17 of the damper 16a and the rotational center axis P0 of the spindle motor 2. Accordingly, in the disk drive apparatus of the first embodiment, the spherical bodies 24 cluster in the position diametrically opposite the center of mass G1 of the disk 1 without fail, thus enhancing the vibration suppressing effect.

FIG. 4 shows the results of an experiment in which the effect of the disk drive apparatus of the first embodiment was examined using a disk 1 having an unbalance amount of about 1 gcm.

In this experiment, the vibrational acceleration of the sub-base 6 was actually measured when the disk 1 was rotated at about 100 Hz. Part (a) of FIG. 4 shows the case of the conventional disk drive apparatus not equipped with a spherical balancer. As shown in part (a) of FIG. 4, in the conventional disk drive apparatus, the sub-base 6 is vibrating with a maximum acceleration of about 8 G. Part (b) of FIG. 4 shows the case of the disk drive apparatus according to the first embodiment of the present invention; the vibrational acceleration is reduced to about 3 G.

In this way, in the disk drive apparatus of the first embodiment, since the vibrational acceleration is reduced, the side pressure being applied to the bearing of the spindle motor 2 by the imbalance force F is reduced, solving the problems of increased bearing damaging torque, damage to the bearing, and shortened bearing life.

As described above, according to the construction of the disk drive apparatus of the first embodiment, the vibration of the sub-base 6 due to the unbalance of the loaded disk 1 can be suppressed reliably without having to increase the stiffness of the insulator 7. Accordingly, the disk drive apparatus of the first embodiment is capable of stable recording or reproducing even when a greatly unbalanced disk 1 is rotated at high speed, and a disk drive apparatus capable of high speed rotation can be achieved without degrading its anti-vibration, anti-shock characteristics.

Second Embodiment

Figure 5:
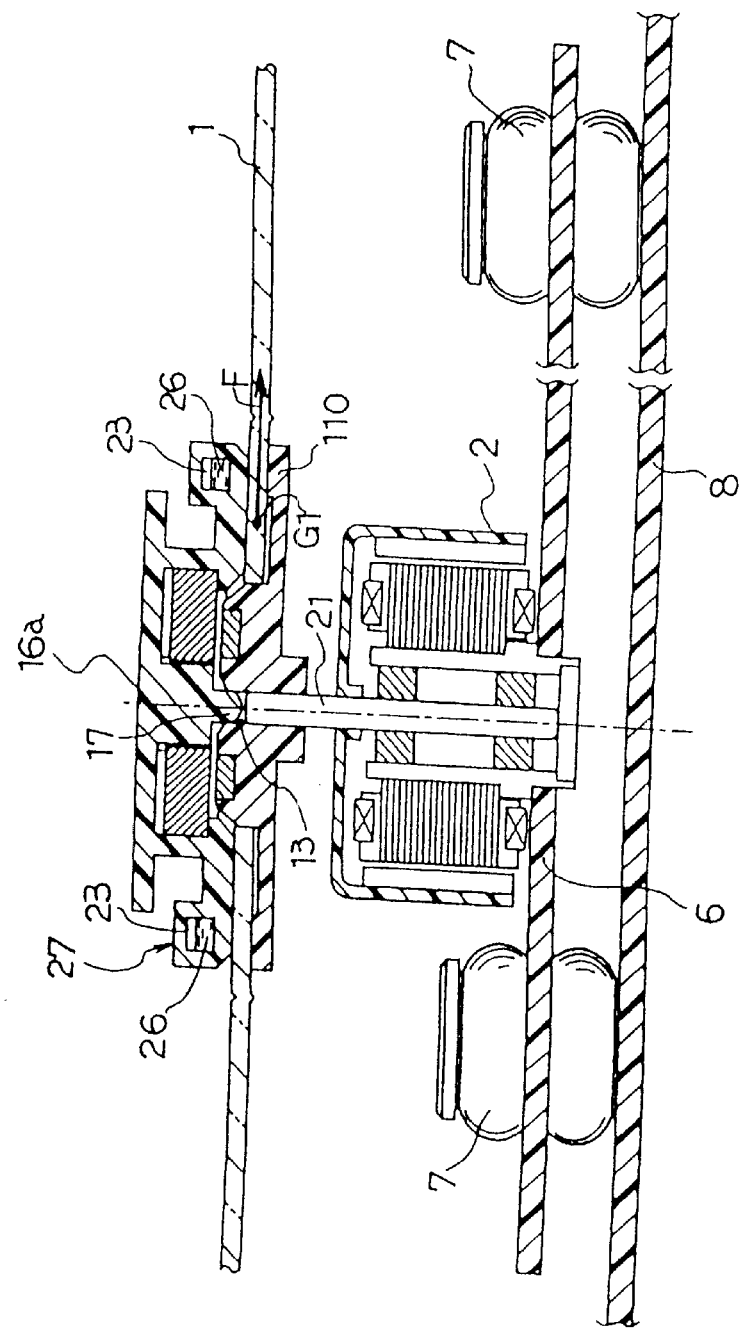
FIG. 5 is a cross-sectional side view showing the vicinity of the spindle motor 2 in a disk drive apparatus according to a second embodiment of the present invention.
Figure 6:
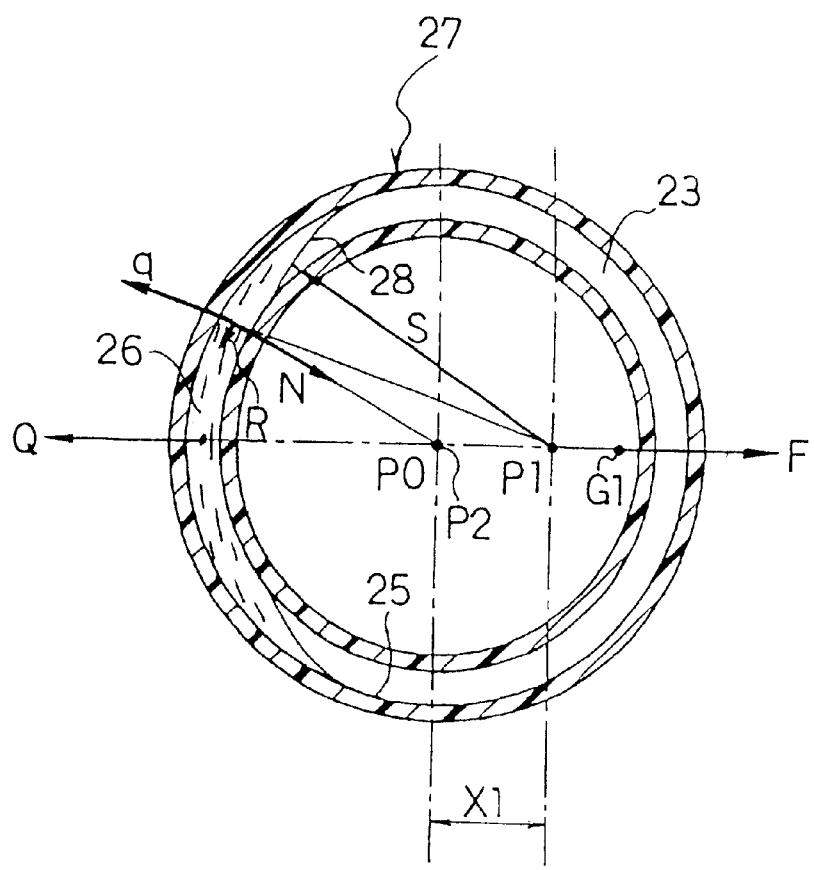
FIG. 6 is a cross-sectional plan view showing a hollow ring member 23 provided on a clamper 16a in the disk drive apparatus of the second embodiment shown in FIG. 5.

Next, a disk drive apparatus according to a second embodiment of the present invention will be described with reference to drawing. FIG. 5 is a cross-sectional side view showing the vicinity of the spindle motor 2 in the disk drive apparatus according to the second embodiment of the present invention. FIG. 6 is a cross-sectional plan view showing only a hollow ring member 23 provided on a damper 16a in the disk drive apparatus of the second embodiment. Here, elements essentially identical to those in the disk drive apparatus of the foregoing first embodiment shown in FIG. 1 or to those in the disk drive apparatus shown in FIGS. 24 and 25 are designated by the same reference numerals, and descriptions of such elements are omitted.

In the disk drive apparatus of the second embodiment of the present invention, the spherical bodies 24 in the hollow ring member 23 provided on the damper 16a in the foregoing first embodiment are replaced by a liquid 26 which is sealed therein to form a liquid balancer 27. In other respects, the construction is the same as that of the foregoing first embodiment. Water, oil, or even a fluid with fine particles suspended therein, is used as the liquid.

In the thus constructed disk drive apparatus of the second embodiment, when a disk 1 with a large unbalance amount is rotated at 100 Hz, the sub-base 6 and the entire component assembly mounted on the sub-base 6 wobble at the rotational frequency of the disk 1 because of the imbalance force F acting on the center of mass, G1, of the disk 1, as in the case of the first embodiment. In the disk drive apparatus of the second embodiment, the resonance frequency of the sub-base 6 (about 60 Hz) due to the deformation of the insulator 7 is set lower than the rotational frequency of the disk 1 (100 Hz), that is, the vibration frequency due to the imbalance force F. As a result, the center axis P1 about which the disk 1 wobbles is located between the center of mass G1 of the disk 1, upon which the imbalance force F is acting, and the rotational center axis P0 of the spindle motor. In this condition, the liquid 26 sealed in the hollow ring member 23 provided on the damper 16a forms a free water surface 28 of radius S with its center at the wobbling center axis P1 because of the centrifugal force Q acting radially from the wobbling center axis P1 toward the outer circumferential wall 25. Thus, the liquid 26 is concentrated in a position diametrically opposite the center of mass G1 of the disk. Accordingly, as in the foregoing first embodiment which used the spherical bodies 24, the imbalance force F acting on the center of mass G1 of the disk 1 is offset by the centrifugal force Q acting on the liquid 26 concentrated in the position diametrically opposite the center of mass G1 of the disk. As a result, in the disk drive apparatus of the second embodiment, the vibration of the sub-base 6 due to the unbalance of the disk 1 is reliably suppressed.

In the second embodiment, the liquid 26 is used instead of the spherical bodies 24 that served as a balancer in the first embodiment; when the liquid 26 used in the second embodiment is compared with the spherical bodies 24 used in the first embodiment assuming that the spherical bodies 24 are steel balls, the centrifugal force Q acting on the liquid 26 is smaller since, generally, a liquid has a smaller specific gravity. In the disk drive apparatus of the second embodiment, therefore, a liquid of a large volume is required if the imbalance force F is to be offset completely. Accordingly, when using a liquid, it is desirable that the balancer be constructed so that the largest possible centrifugal force Q can be generated utilizing the space allowed for the balancer within the apparatus.

The magnitude of the centrifugal force Q acting on the liquid 26 increases as the radius of the outer circumferential wall 25 of the hollow ring member 23 and the volume of the liquid 26 sealed therein increase; when both are limited, the magnitude is determined by the specific gravity of the liquid 26 and the radius S of the free water surface 28. The radius S of the free water surface 28 increases with increasing distance between the center of the hollow ring member 23 and the wobbling center axis P1 of the disk 1, that is, with increasing rotational radius X1 of the wobbling motion. Therefore, if the center P2 of the hollow ring member 23 is displaced by ΔX from the rotational center axis P0 of the spindle motor, as shown in FIG. 3, the radius S of the free water surface 28 decreases correspondingly.

However, the disk drive apparatus of the second embodiment, as in the foregoing first embodiment, employs the construction such that the positioning is achieved with the center projection (center axis) 17 provided on the damper 16a engaging with the hole in which the spindle shaft 21 of the spindle motor 2 is fitted, that is, the same hole as the positioning hole 13, to substantially eliminate the positional displacement between the center P2 of the hollow ring member 23 and the rotational center axis P0 of the spindle motor 2. With this construction, the disk drive apparatus of the second embodiment prevents the rotational radius X1 of the wobbling motion from decreasing, and allows the radius S of the free water surface 28 to be increased, making it possible to generate a larger centrifugal force Q within a limited volume.

Further, in the second embodiment, the liquid 26 is used in place of the spherical bodies 24 used as a balancer in the first embodiment; in the case of a liquid, since there are fewer factors that impede its movement, the balancer can be concentrated reliably in a position opposite the disk mass center G1, so that a stable effect can be obtained with the disk drive apparatus of the second embodiment. More specifically, when the unbalance amount is relatively small, or when a performance of increased stability is required, the balancer using a liquid as in the second embodiment achieves a greater effect.

The second embodiment has dealt with an example in which a liquid is used as the balancer, but it will be appreciated that a similar effect to that of the second embodiment can be obtained if a powder or a mixed fluid of liquid with spherical bodies is used.

Third Embodiment

Figure 7:
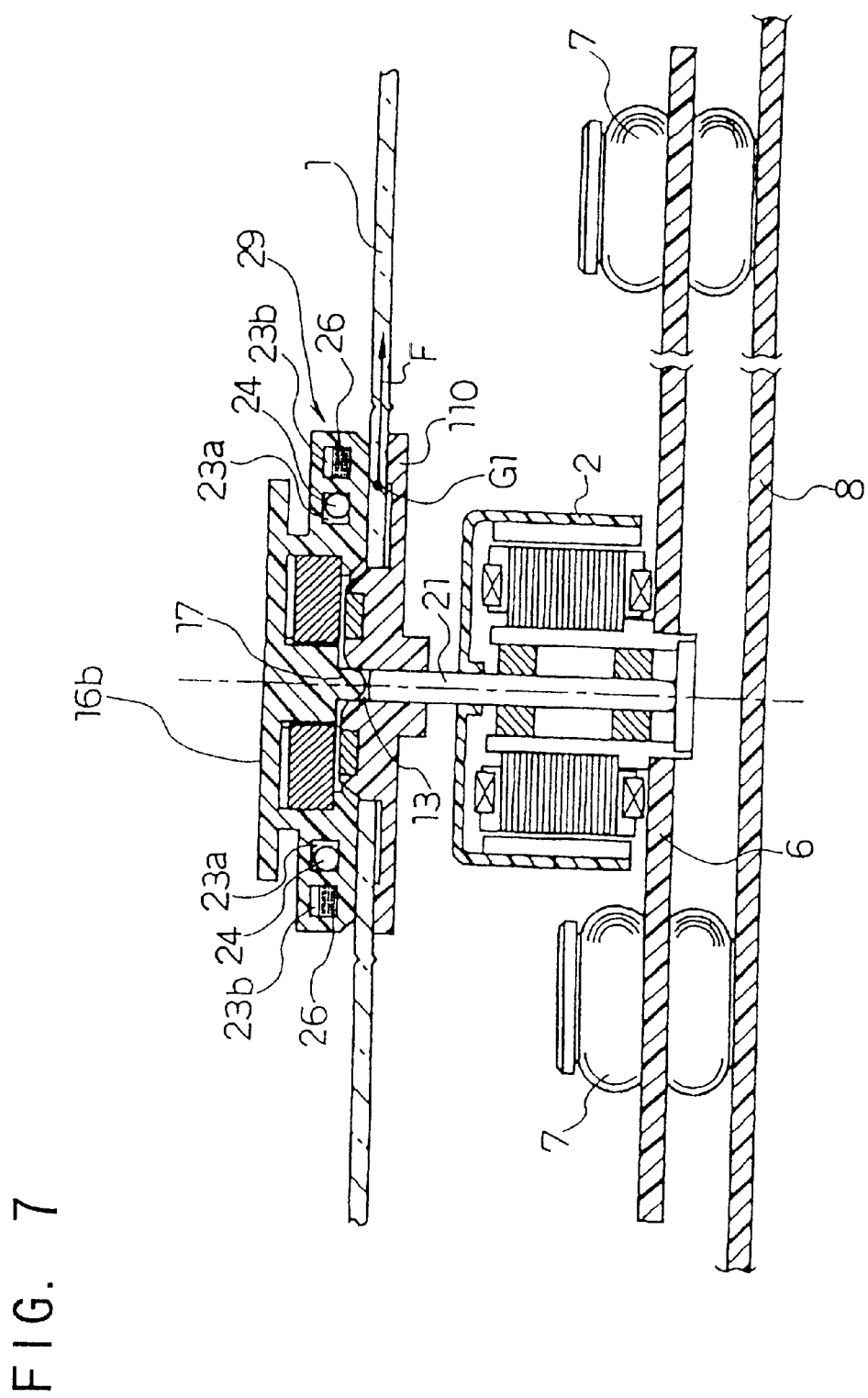
FIG. 7 is a cross-sectional side view showing the vicinity of the spindle motor 2 in a disk drive apparatus according to a third embodiment of the present invention.
Figure 8:
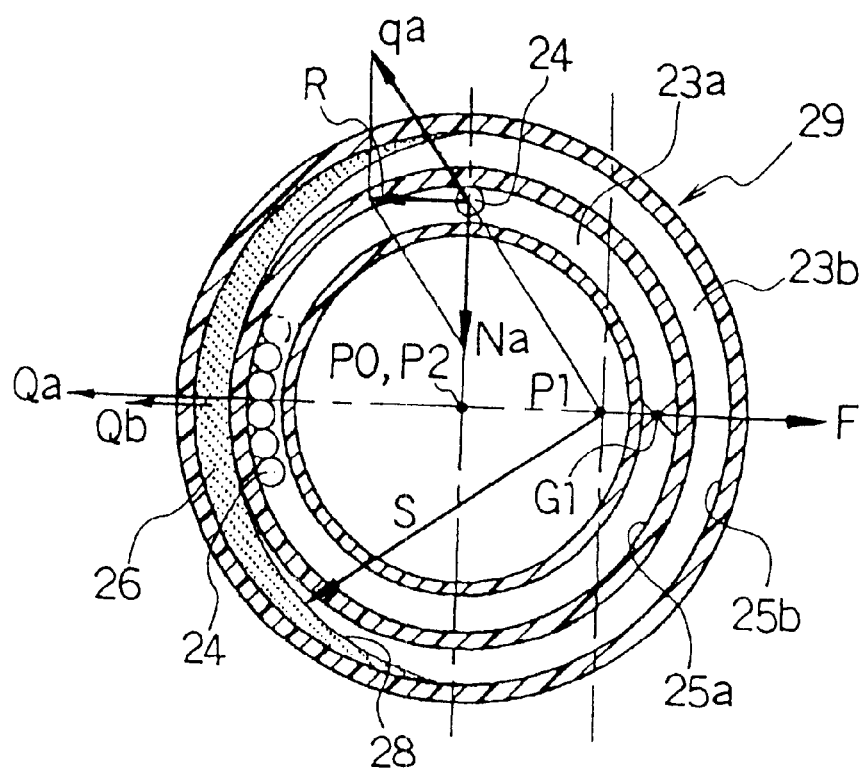
FIG. 8 is a cross-sectional plan view showing hollow ring members 23a and 23b provided on a damper 16b in the disk drive apparatus of the third embodiment shown in FIG. 7.

Next, a disk drive apparatus according to a third embodiment of the present invention will be described with reference to drawing. FIG. 7 is a cross-sectional side view showing the vicinity of the spindle motor 2 in the disk drive apparatus according to the third embodiment of the present invention. FIG. 8 is a cross-sectional plan view showing only hollow ring members 23a and 23b provided on a clamper 16a in the disk drive apparatus of the third embodiment. Here, elements essentially identical to those in the disk drive apparatus of the foregoing first and second embodiments or to those in the disk drive apparatus shown in FIGS. 24 and 25 are designated by the same reference numerals, and descriptions of such elements are omitted.

In the disk drive apparatus of the third embodiment of the present invention, the two hollow ring members 23a and 23b are provided concentrically with the center projection (center axis) 17 formed on the damper 16b for positioning with respect to the turn table 110. Inside the first hollow ring member 23a located on the inner circumferential side are housed a plurality of spherical bodies 24 in movable fashion, while the second hollow ring portion 23b located on the outer circumferential side contains a liquid 26.

Thus the spherical bodies 24 in the first hollow ring member 23a and the liquid 26 in the second hollow ring member 23b together constitute a balancer 29. This balancer 29 is formed integrally with the damper 16b. In other respects, the construction is the same as that of the first embodiment, and the description thereof is therefore omitted.

In the thus constructed disk drive apparatus of the third embodiment, when a disk 1 with a large unbalance amount is rotated at 100 Hz, the insulator 7 deforms due to the imbalance force F acting on the center of mass G1 of the disk 1, and the sub-base 6 and the entire component assembly mounted on the sub-base 6 wobble at the rotational frequency of the disk 1, as in the case of the first embodiment.

In the third embodiment, the resonance frequency of the sub-base 6 (about 60 Hz) due to the deformation of the insulator 7 is set lower than the rotational frequency of the disk 1 (about 100 Hz), so that the sub-base 6 is always deformed in a direction substantially opposite to the acting direction of the imbalance force F. As a result, the wobbling center axis P1 of the disk 1 rotating above the sub-base 6 is located between the center of mass, G1 of the disk 1, upon which the imbalance force F is acting, and the rotational center axis P0 of the spindle motor, as shown in FIG. 8.

In the disk drive apparatus of the third embodiment, the first hollow ring member 23a and second hollow ring member 23b provided on the clamper 16b are formed concentrically, and their center P2 is positioned substantially concentric with the rotational center axis P0 of the spindle motor 2. As a result, the center P2 of the outer circumferential wall 25a of the first hollow ring member 23a and the outer circumferential wall 25b of the second hollow ring member 23b coincides with the rotational center axis P0 of the spindle motor 2, and wobbles about the wobbling center axis P1.

The plurality of spherical bodies 24 contained in the first hollow ring 23a move along the outer circumferential wall 25a due to the moving force R which is the resultant force of the centrifugal force qa and the reaction from the outer circumferential wall 25a, and cluster toward the position substantially diametrically opposite the center of mass G1 of the disk 1 across the wobbling center axis P1, thus generating a centrifugal force Qa, as in the previously described first embodiment.

On the other hand, the liquid 26 sealed in the second hollow ring member 23b forms a free water surface 28 of radius S with its center at the wobbling center axis P1 by the action of a centrifugal force Qb, as in the foregoing second embodiment. Accordingly, the liquid 26 is concentrated in the position substantially diametrically opposite the disk mass center G1.

As a result, the imbalance force F acting on the center of mass G of disk 1 is offset by the centrifugal forces Qa and Qb acting on the plurality of spherical bodies 24 and the liquid 26, respectively, gathered in the position substantially diametrically opposite the center of mass G1 of the disk 1, thus suppressing the vibration of the sub-base 6 that occurs when the unbalanced disk 1 is rotated.

When both the first hollow ring member 23a with the spherical bodies 24 contained therein and the second hollow ring member 23b with the liquid 26 sealed therein are provided on the clamper 16b, as in the above third embodiment, the respective shortcomings of the spherical balancer and liquid balancer are compensated for and a better vibration suppressing effect can be obtained.

Figure 9:
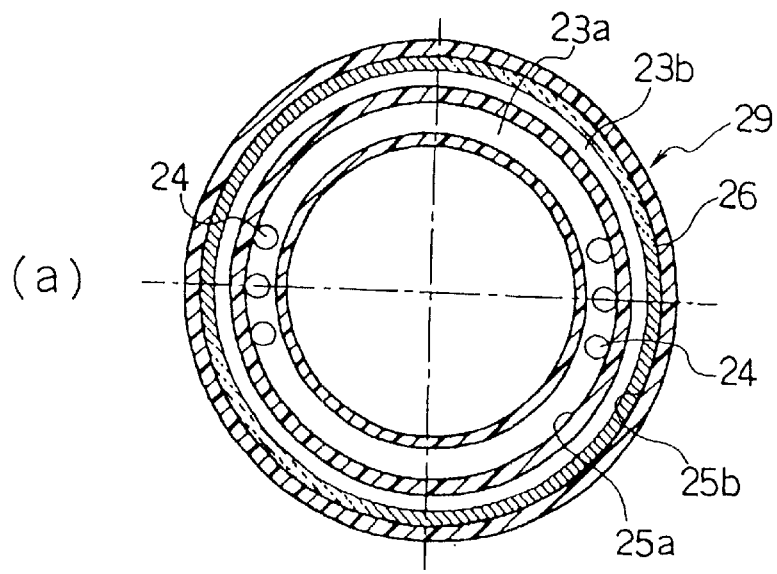
FIG. 9 is a cross-sectional plan view of the hollow ring members 23a and 23b, explaining the positions of spherical bodies 24 and liquid 26 when the mass imbalance of a disk 1 is small in the third embodiment shown in FIG. 7.
Figure 9:
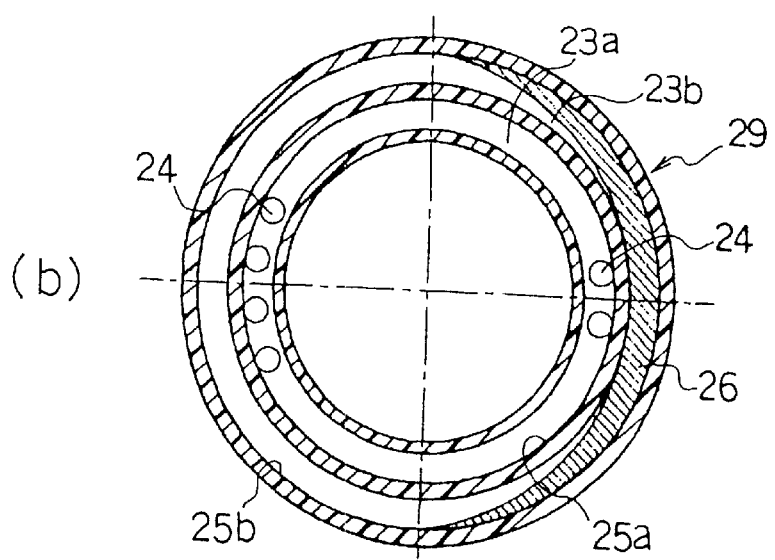

Next, the complementary effect of the spherical balancer and liquid balancer will be described with reference to FIGS. 8 and 9. FIG. 9 illustrates the positions of the spherical bodies 24 and liquid 26 when a well-balanced, ideal disk is rotated.

When a greatly unbalanced disk 1 is rotated, the spherical bodies 24 and the liquid 26 are concentrated in the position substantially diametrically opposite the disk mass center G1, and the imbalance force F is offset primarily by the centrifugal force Qa acting on the spherical bodies 24 having a larger specific gravity.

On the other hand, when a well-balanced, ideal disk 1 is rotated, the spherical bodies 24 and the liquid 26 are unevenly distributed in position. With this uneven positional distribution, there arises the possibility that the clamper 16b may be thrown out of balance by the spherical bodies 24 or the liquid 26 itself. Accordingly, it is desirable that the plurality of spherical bodies 24 be moved to positions counterbalancing each other and the liquid 26 be evenly distributed, as shown in part (a) of FIG. 9.

However, since the spherical bodies 24 are subjected to frictional resistance and rolling resistance along the outer circumferential wall 25a and bottom surface of the first hollow ring member 23a, the movement of the spherical bodies 24 is impeded if the moving force R acting on the spherical bodies 24 is smaller than these resistive forces. As previously described in the explanation of the first embodiment, the moving force R acting on the spherical bodies 24 is proportional to the radius X1 of the wobbling motion shown in FIG. 3, and the radius X1 of the wobbling motion increases as the imbalance force F increases. Accordingly, in case of a disk 1 almost free from mass imbalance, the spherical bodies 24 cannot be moved to the positions counterbalancing each other as shown in part (a) of FIG. 9, unless the amount of unbalance due to the spherical bodies 24 themselves becomes greater than a certain level, for example, with the spherical bodies 24 temporarily gathering in one position and causing an unbalanced condition.

By contrast, the liquid 26 sealed in the second hollow ring member 23b moves without fail even when the unbalance is small, since there are few factors impeding its movement. Accordingly, as shown in part (b) of FIG. 9, even when the spherical bodies 24 cannot be moved to the desired positions, the liquid 26 is gathered in a position counterbalancing the imbalance in the spherical bodies 24 themselves, and the vibration can thus be suppressed.

As described above, according to the construction of the third embodiment of the present invention, the vibration of the sub-base 6 can be suppressed regardless of whether the mass of the disk 1 rotating at high-speed is greatly unbalanced or well balanced; therefore, the disk drive apparatus of the third embodiment ensures stable recording or playback on any disk 1 without generating noise, and a disk drive apparatus capable of higher speed rotation can thus be achieved.

Fourth Embodiment

Figure 10:
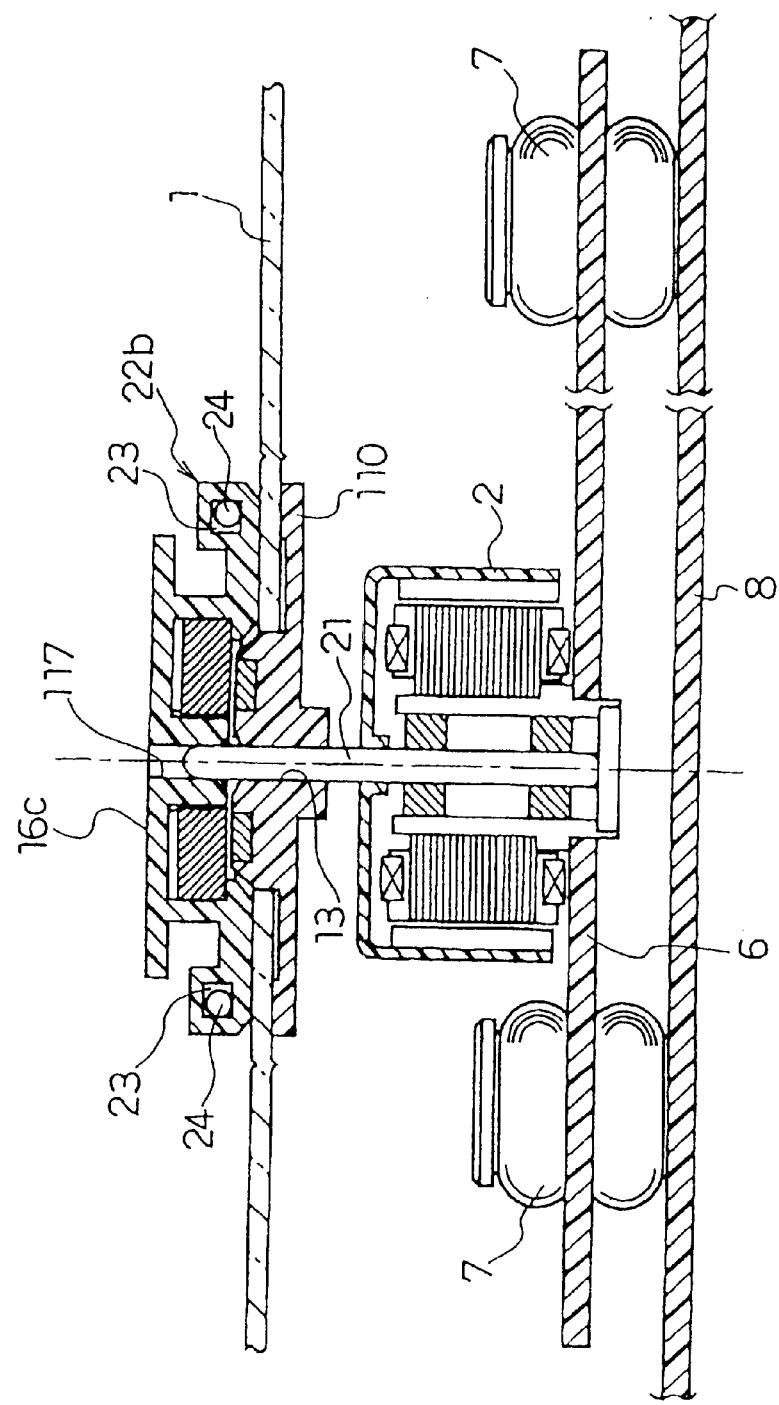
FIG. 10 is a cross-sectional side view showing the vicinity of the spindle motor 2 in a disk drive apparatus according to a fourth embodiment of the present invention.

Next, a disk drive apparatus according to a fourth embodiment of the present invention will be described with reference to drawing. FIG. 10 is a cross-sectional side view showing the vicinity of the spindle motor 2 in the disk drive apparatus according to the fourth embodiment of the present invention. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the fourth embodiment of the present invention, the spindle shaft 21 is fitted into the positioning hole 13 formed in the turn table 110 and is passed through the positioning hole 13. The spindle shaft 21 passed through the positioning hole 13 in the turn table 110 is fitted into the center hole 117 formed in the center of the damper 16c, and the damper 16c is positioned in place with the spindle shaft 21 passing through it.

The hollow ring member 23 is provided concentrically with the center hole 117 in the damper 16c, and inside the hollow ring member 23 are housed a plurality of spherical bodies 24. Thus the hollow ring member 23 and the spherical bodies 24 together constitute a spherical balancer 22b, and the spherical balancer 22b is formed integrally with the damper 16c. In other respects, the construction is the same as that of the previously described first embodiment.

In the thus constructed disk drive apparatus of the fourth embodiment, when a disk 1 having a large unbalance amount is rotated at 100 Hz, the wobbling center axis P1 of the disk 1 rotating on the sub-base 6 is located between the center of mass G1 of the disk 1, upon which the imbalance force F is acting, and the rotational center axis P0 of the spindle motor, as in the case of the first embodiment shown in FIG. 2.

As shown in FIG. 10, the hollow ring member 23 provided on the clamper 16c in the disk drive apparatus of the fourth embodiment is formed concentrically with the center hole 117. Further, the center hole 117 is formed so as to directly fit onto the spindle shaft 21 which is the rotational center axis of the spindle motor 2. Accordingly, the displacement ΔX of the center P2 of the outer circumferential wall 25 of the hollow ring member 23 with respect to the rotational center axis P0 of the spindle motor 2 is setted to substantial zero, as in the first embodiment previously shown in FIG. 3. This serves to avoid the problem that the vibration suppressing effect of the spherical bodies 24 is reduced because of the positional displacement between the center P2 of the hollow ring member 23 and the rotational center axis P0 of the spindle motor 2, as previously described in connection with the first embodiment.

As described above, with the construction of the fourth embodiment of the present invention, the vibration suppressing effect of the balancer using the spherical bodies 24 can be further enhanced.

Fifth Embodiment

Figure 11:
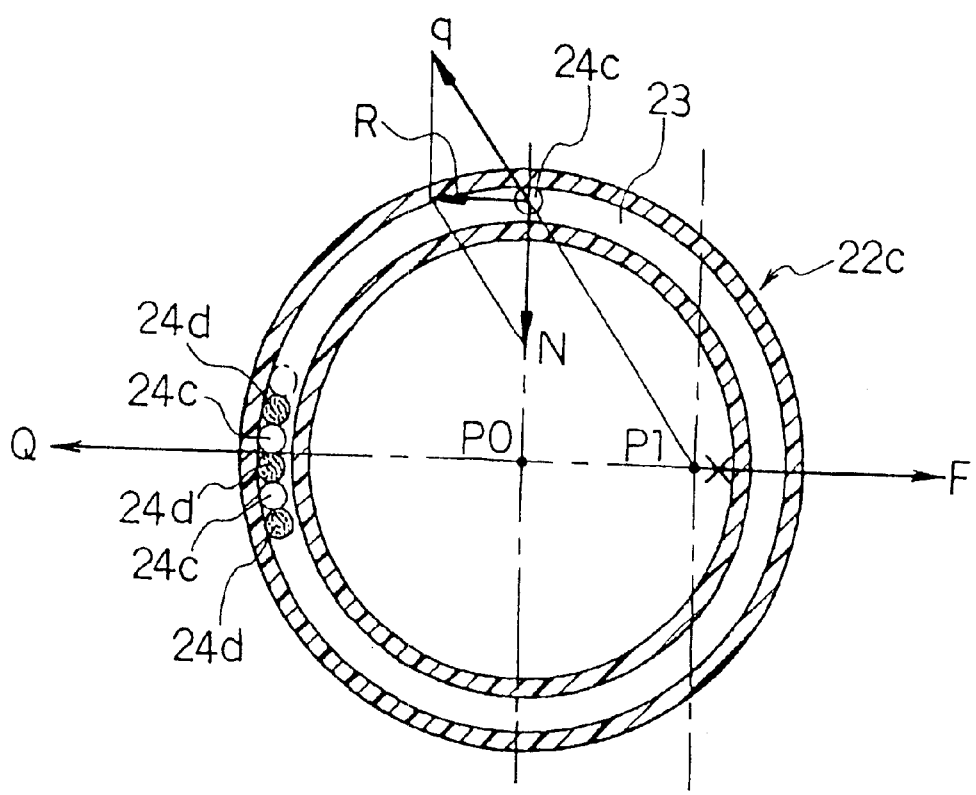
FIG. 11 is a cross-sectional plan view showing a hollow ring member 23 provided on a damper in a disk drive apparatus of a fifth embodiment of the present invention.

Next, a disk drive apparatus according to a fifth embodiment of the present invention will be described with reference to drawing. FIG. 11 is a cross-sectional plan view showing the hollow ring member 23 provided on the damper in the disk drive apparatus of the fifth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

The disk drive apparatus of the fifth embodiment of the present invention is aimed at reducing the magnitude of the noise occurring from the balancer itself, and as in the first embodiment previously shown in FIG. 1, the spherical balancer 22c is formed integrally with the clamper.

As shown in FIG. 11, in the disk drive apparatus of the fifth embodiment, metal spherical bodies 24c and plastic spherical bodies 24d arranged in alternating fashion are housed inside the hollow ring member 23. In other respects, the construction is the same as that of the previously described first embodiment.

In the thus constructed disk drive apparatus of the fifth embodiment, when a disk 1 with a large unbalance amount is rotated at 100 Hz, the metal spherical bodies 24c and plastic spherical bodies 24d are concentrated in the position substantially diametrically opposite the disk mass center G1 by the moving force R acting on the respective spherical bodies, as in the previously described first embodiment. Since the resultant force Q of the centrifugal forces acting on the respective spherical bodies works to offset the imbalance force F acting on the disk mass center G1, the vibration of the sub-base 6 in the disk drive apparatus of the fifth embodiment is suppressed.

Next, a description will be given of the movements of the spherical bodies in the spherical balancer when the disk 1 is in a stopped condition, or when the rotational frequency is low during acceleration where the disk 1 is accelerated from the stopped condition toward a target rotational frequency or during deceleration where the disk 1 is decelerated for stopping.

When the disk 1 is in a stopped condition, no centrifugal forces are acting on the spherical bodies as a matter of course, and when the rotational frequency is low, the centrifugal forces acting on the spherical bodies are small; as a result, a situation can occur where the spherical bodies are not pressed against the outer circumferential wall 25 of the hollow ring member 23. Accordingly, when vibration is applied from the outside during transportation of the disk drive apparatus, or when the disk 1 is in an early stage of the acceleration process or at the end of the deceleration process, the spherical bodies move freely inside the hollow ring member 23, and hit against each other or against the inner wall surfaces of the hollow ring member 23. As a result, if all the spherical bodies are made of a hard material such as metal, colliding noise will occur in the above conditions, and the magnitude of the noise may increase to an undesirable level.

In the fifth embodiment of the present invention, therefore, the metal spherical bodies 24c arranged alternately between the plastic spherical bodies 24d having a lower hardness are housed inside the hollow ring member 23, as shown in FIG. 11, thus at least avoiding the possibility of the hard metal spherical bodies 24c directly hitting against each other. With this construction, the disk drive apparatus of the fifth embodiment can reduce the magnitude of the noise occurring when the disk 1 is in a stopped condition or is in an early stage of the acceleration process or at the end of the deceleration process.

Here, the plastic spherical bodies 24d may be formed entirely from a plastic material, but the same effect can be obtained if they are formed from metal spherical bodies coated with a plastic material or vibration isolating rubber.

As described above, with the construction of the fifth embodiment of the present invention, a disk drive apparatus can be achieved that ensures stable recording or reproducing playback even when a disk with a greatly unbalanced mass is rotated at high speed, and that does not generate undesirable noise not only during high speed rotation but also during the acceleration or deceleration of disk rotation, or even during transportation of the apparatus.

Sixth Embodiment

Figure 12:
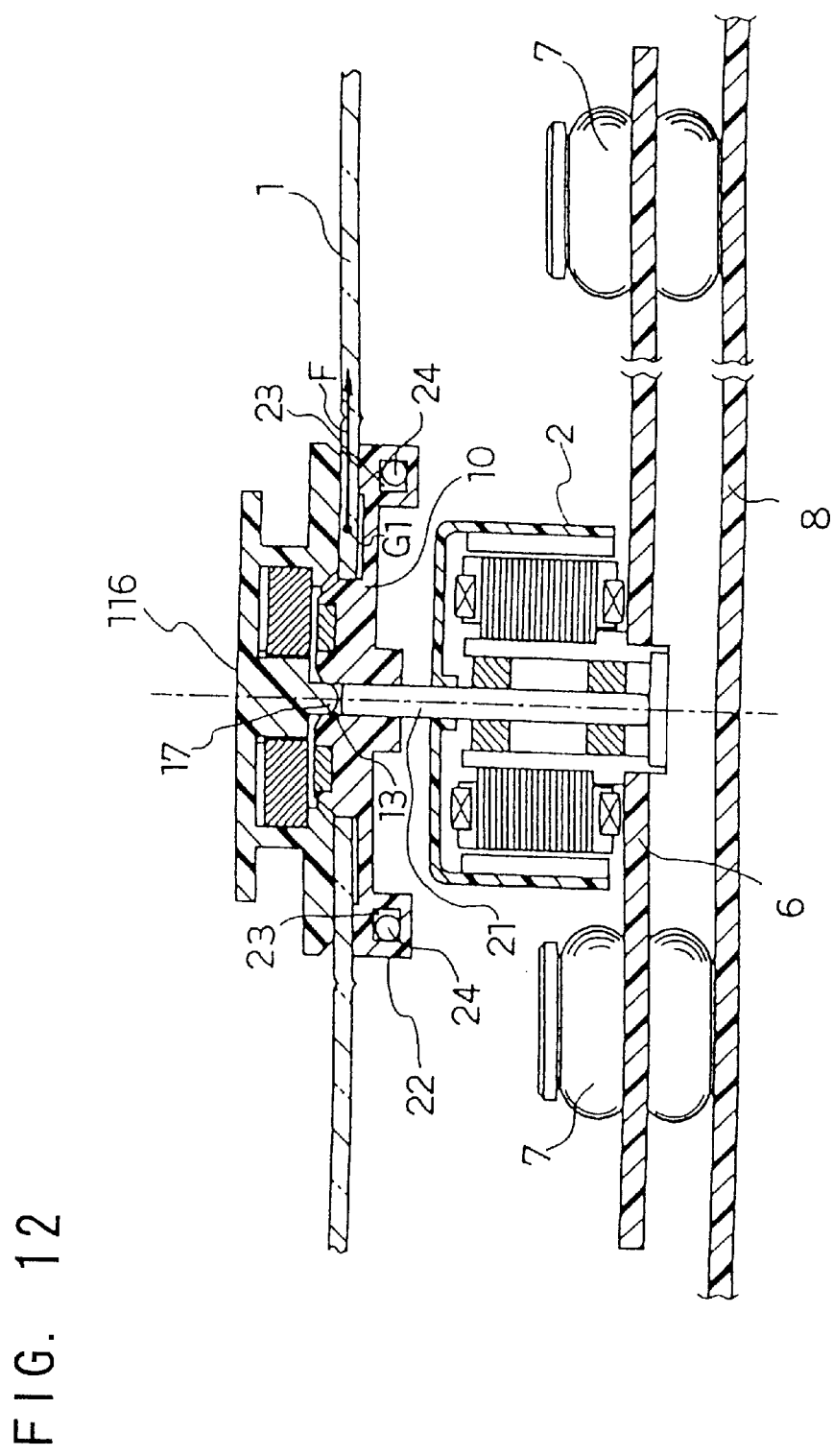
FIG. 12 is a cross-sectional side view showing the vicinity of the spindle motor 2 in a disk drive apparatus according to a sixth embodiment of the present invention.

Next, a disk drive apparatus according to a sixth embodiment of the present invention will be described with reference to drawing. FIG. 12 is a cross-sectional side view showing the vicinity of the spindle motor 2 in the disk drive apparatus according to the sixth embodiment of the present invention. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the sixth embodiment of the present invention, the hollow ring member 23 which was provided on the damper 16 in the first embodiment is provided on the turn table 10. Inside the hollow ring member 23 in the sixth embodiment are housed a plurality of spherical bodies 24 in movable fashion. The damper 116 used in the sixth embodiment is the same as that used in the disk drive apparatus shown in FIGS. 24 and 25; in other respects, the construction of the sixth embodiment is the same as that of the previously described first embodiment.

In the disk drive apparatus of the sixth embodiment, the plurality of spherical bodies 24 are contained in movable fashion inside the hollow ring member 23. Accordingly, since the hollow ring member 23 is provided on the turn table 10 which is always constructed in integral fashion with the shaft 21 of the spindle motor 2, it is easy to form the center axis of the hollow ring member 23 so as to be coaxial with the spindle motor rotational center axis P0 of the hollow ring member 23. As a result, the displacement between the center axis P2 of the outer circumferential wall 25 of the hollow ring member 23 and the rotational center axis P0 of the spindle motor can be virtually eliminated, and the effect of the ball balancer 22 can be obtained stably and consistently. In the sixth embodiment, the plurality of spherical bodies 24 are housed inside the hollow ring member 23 provided on the turn table 10, but it will be appreciated that the same effect can be obtained if the liquid 26 is sealed therein instead of the spherical bodies 24.

Seventh Embodiment

Figure 13:
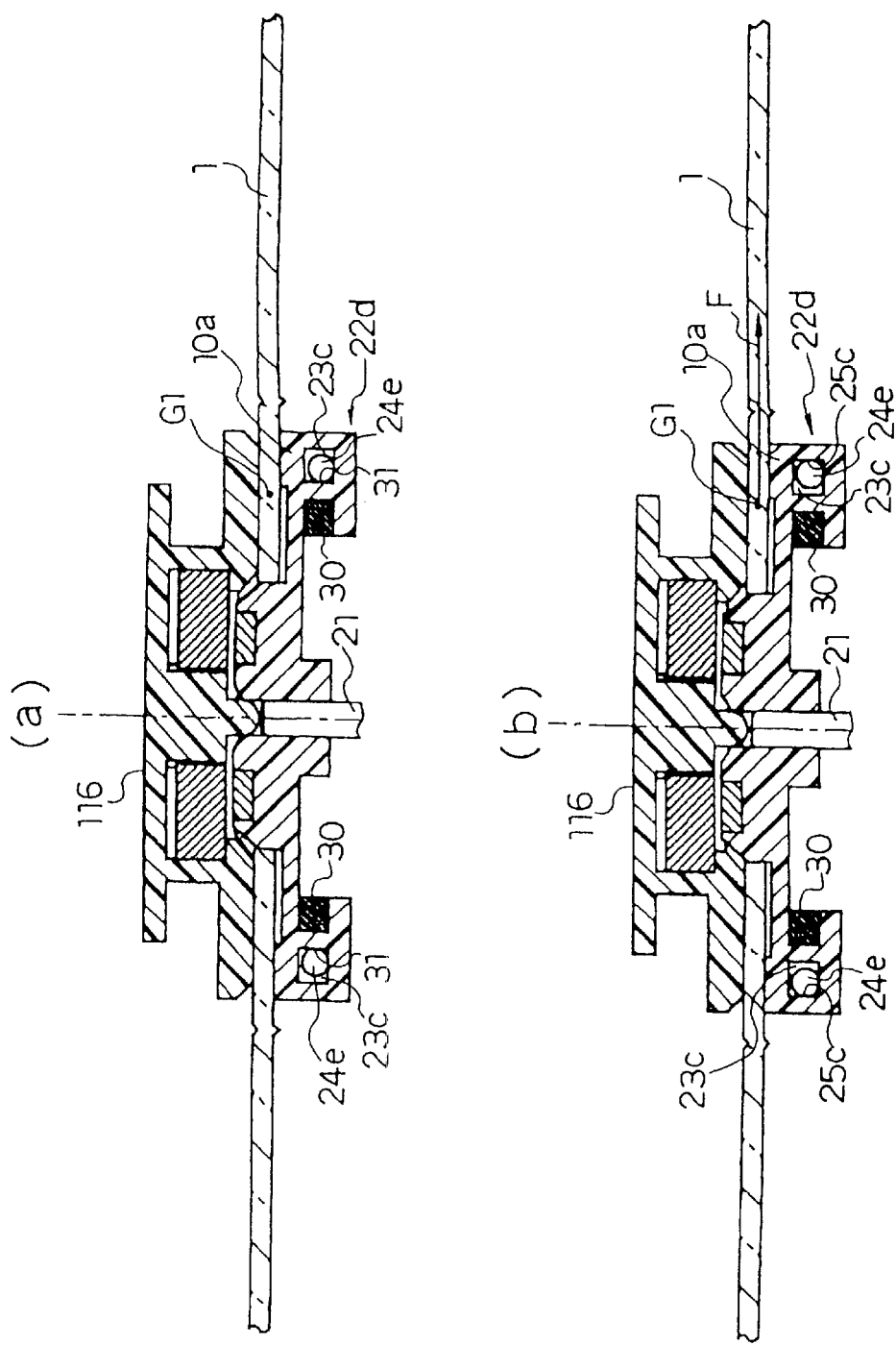
FIG. 13 is a cross-sectional side view showing the vicinity of the spindle motor 2 in different conditions in a disk drive apparatus according to a seventh embodiment of the present invention.

Next, a disk drive apparatus according to a seventh embodiment of the present invention will be described with reference to drawing. Parts (a) and (b) of FIG. 13 are cross-sectional side views showing the vicinity of the spindle motor 2 in the disk drive apparatus of the seventh embodiment. The part (a) of FIG. 13 shows the condition in which the disk 1 is stationary or is rotating at slow speed, while the part (b) of FIG. 13 shows the condition in which the disk 1 is rotating at high speed. Here, elements essentially identical to those in the disk drive apparatus of the first and second embodiments or to those in the disk drive apparatus shown in FIGS. 24 and 25 are designated by the same reference numerals, and descriptions of such elements are omitted.

The seventh embodiment of the present invention concerns a disk drive apparatus that is able to reduce the magnitude of the noise occurring from the balancer itself. As shown in the parts (a) and (b) of FIG. 13, the hollow ring member 23c is provided on the turn table 10a, and a plurality of magnetic spherical bodies 24e are housed inside the hollow ring member 23c. The spherical balancer 22d consisting of the hollow ring member 23c and the magnetic spherical bodies 24e is formed integrally with the turn table 10a.

In the disk drive apparatus of the seventh embodiment, a ring-shaped magnet 30 is mounted on the inner circumferential side of the hollow ring member 23c. Further, the damper 116 used in the disk drive apparatus of the seventh embodiment is the same as that used in the conventional disk drive apparatus; in other respects, the construction is the same as that of the previously described first embodiment.

In the disk drive apparatus of the seventh embodiment, since the plurality of magnetic spherical bodies 24e are contained inside the hollow ring member 23c, and the ring-shaped magnet 30 is mounted on the inner circumferential side of the hollow ring member 23c, the magnetic spherical bodies 24e are acted upon by the attractive force from the magnet 30 so that the magnetic a spherical bodies 24e are urged at all times in such a direction as to contact the inner circumferential wall 31 of the hollow ring member 23c. As a result, when the disk 1 is stationary, or when the rotational frequency of the disk 1 is low in an early stage of the acceleration process or at the end of the deceleration process, and the centrifugal force acting on the magnetic spherical bodies 24e is small, the magnetic spherical bodies 24e are made to adhere to the inner circumferential wall 31 of the hollow ring member 23c by the attractive force of the magnet 30, as shown in the part (a) of FIG. 13.

Accordingly, when vibration is applied from the outside during transportation of the disk drive apparatus, or when the disk 1 is in an early stage of the acceleration process or at the end of the deceleration process, as described in the explanation of the fifth embodiment, the spherical bodies are prevented from hitting against each other or against the inner wall surfaces of the hollow ring member 23c, and generation of undesirable noise can thus be avoided.

On the other hand, when the rotational frequency of the disk 1 increases to the point where the vibration caused by the unbalance of the disk 1 becomes undesirably large, the magnetic spherical bodies 24e are pressed against the outer circumferential wall 25c of the hollow ring member 23c by its centrifugal force, as shown in the part (b) of FIG. 13.

For example, when the disk 1 is accelerated for rotation, and the rotational frequency of the disk 1 increases to the point where the centrifugal force acting on the magnetic spherical bodies 24e becomes greater than the attractive force of the magnet 30, the magnetic spherical bodies 24e adhering to the inner circumferential wall 31 are thrown toward the outer circumferential wall 25c.

When fs denotes the rotational frequency that causes the magnetic spherical bodies 24e to be thrown toward the outer circumferential wall 25c, fh denotes the rotational frequency that generates a centrifugal force sufficient to press and hold the magnetic spherical bodies 24e against the outer circumferential wall 25c, and fn denotes the rotational frequency where the vibration caused by the unbalance of the disk 1 becomes undesirably large, it is desirable that the relation between them be set as fh<fs<fn. That is, it is desirable that fs be set sufficiently higher than fh so that the magnetic spherical bodies 24e can be attracted and held securely even if vibration or shock is applied from the outside when the rotational frequency of the disk 1 is lower than fh, and it is preferable that the magnitude of the attractive force of the magnet 30 is set so that fs is lower than fn and the vibration suppressing effect of the spherical balancer 22c can be displayed.

Further, in the disk drive apparatus of the seventh embodiment, since the hollow ring member 23c is provided on the turn table 10a fixed to the spindle shaft 21 of the spindle motor 2, it is easy to form the center axis of the hollow ring member 23c to be coaxial with the spindle motor rotational center axis P0 of the hollow ring member 23c.

Accordingly, the displacement ΔX between the center P2 of the outer circumferential wall 25 and the rotational center axis P0 of the spindle motor, such as previously shown in FIG. 3, is almost eliminated; this serves to avoid the problem that the vibration suppressing effect of the spherical bodies 24 is reduced because of the positional displacement between the center of the hollow ring member 23 and the rotational center axis P0 of the spindle motor 2, as previously described in connection with the first embodiment.

Furthermore, if magnetic steel balls having a large specific gravity are used as the spherical bodies housed inside the hollow ring member 23c, it is possible to further enhance the effect of suppressing the vibration caused by the imbalance force.

As described above, with the construction of the seventh embodiment of the present invention, a disk drive apparatus can be achieved that ensures stable recording or reproducing even when a disk with a greatly unbalanced mass is rotated at high speed, and that does not generate undesirable noise not only during high speed rotation but also during the acceleration or deceleration of disk rotation, or even during transportation of the apparatus.

Eighth Embodiment

Figure 14:
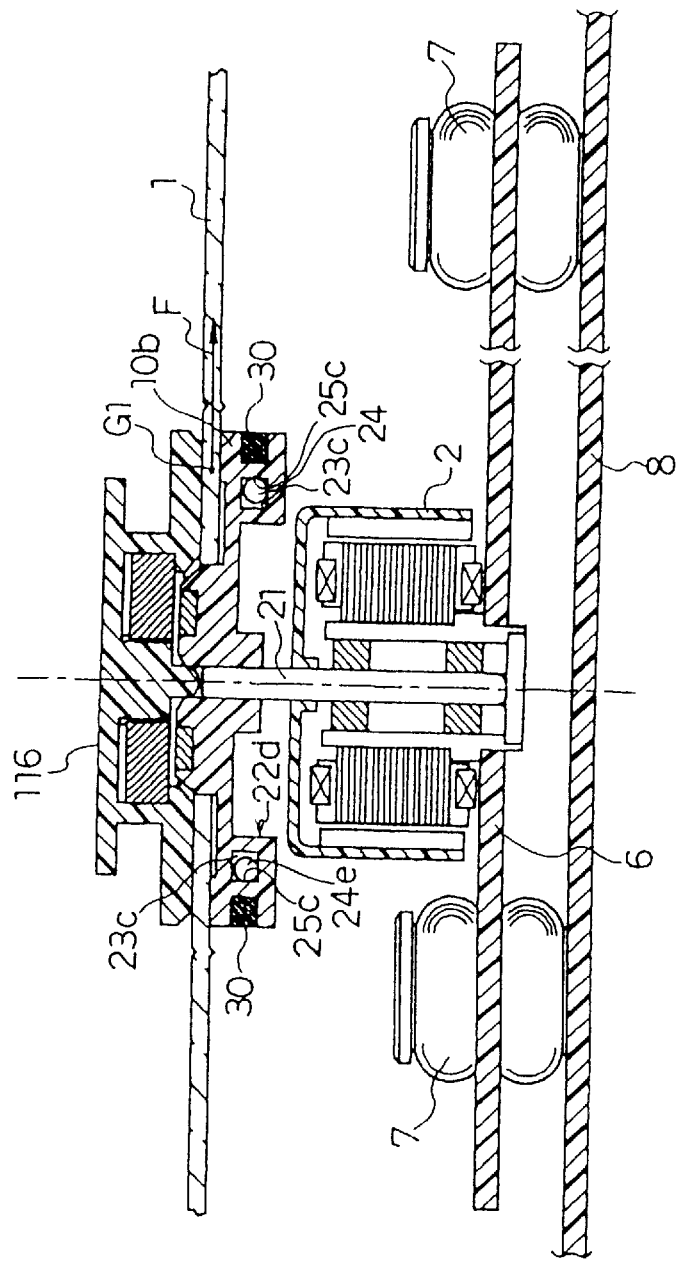
FIG. 14 is a cross-sectional side view showing the vicinity of the spindle motor 2 in a disk drive apparatus according to an eighth embodiment of the present invention.

Next, a disk drive apparatus according to an eighth embodiment of the present invention will be described with reference to drawing. FIG. 14 is a cross-sectional side view showing the vicinity of the spindle motor 2 in the disk drive apparatus of the eighth embodiment. Here, elements essentially identical to those in the disk drive apparatus of the foregoing first and second embodiments or to those in the disk drive apparatus shown in FIGS. 24 and 25 are designated by the same reference numerals, and descriptions of such elements are omitted.

In the disk drive apparatus of the eighth embodiment of the present invention, the hollow ring member 23c is provided on the turn table 10b, as shown in FIG. 14, and a plurality of magnetic spherical bodies 24e are contained inside the hollow ring member 23c; the spherical balancer 22d consisting of the hollow ring member 23c and the magnetic spherical bodies 24e is formed integrally with the turn table 10b.

In the disk drive apparatus of the eighth embodiment, the ring-shaped magnet 30 is mounted on the outer circumferential side of the hollow ring member 23c. In other respects, the construction is the same as that of the foregoing seventh embodiment.

In the thus constructed eighth embodiment, as in the foregoing seventh embodiment, the magnetic spherical bodies 24e are acted upon by the attractive force from the magnet 30 so that the magnetic spherical bodies 24e are urged at all times in such a direction as to contact the outer circumferential wall 25c of the hollow ring member 23c. As a result, when the disk 1 is stationary, or when the rotational frequency of the disk 1 is low during the starting of disk rotation or at the end of the deceleration process, and the centrifugal force acting on the magnetic spherical bodies 24e is small, the magnetic spherical bodies 24e are made to stick to the outer circumferential wall 25c of the hollow ring member 23c by the attractive force of the magnet 30. Accordingly, as in the foregoing seventh embodiment, when vibration is applied from the outside during transportation of the disk drive apparatus, or when the disk 1 is in an early stage of the acceleration process or at the end of the deceleration process, the spherical bodies are prevented from hitting against each other or against the inner wall surfaces of the hollow ring member 23c, and generation of undesirable noise can thus be avoided.

In the disk drive apparatus of the eighth embodiment, unlike the foregoing seventh embodiment, the magnetic spherical bodies 24e are kept contacting and adhering to the outer circumferential wall 25c regardless of the rotational frequency of the disk 1 and even when the disk 1 is stationary. Accordingly, in the disk drive apparatus of the eighth embodiment, if the magnet 30 is magnetized so that the attractive force of the magnet 30 acting on the magnetic spherical bodies 24e does not become excessive but becomes uniform along the entire circumference of the outer circumferential wall 25c, the attractive force of the magnet 30 does not prevent the magnetic spherical bodies 24e from moving to the position opposite the disk mass center G1, and a sufficient vibration suppressing effect can be obtained. Preferably, the magnet 30 is single-pole magnetized, for example, in the direction of the center axis of the outer circumferential wall 25c.

As described above, with the construction of the eighth embodiment of the present invention, a disk drive apparatus capable of high speed rotation can be achieved that ensures stable recording or reproducing even when a disk with a greatly unbalanced mass is rotated at high speed, and that does not generate undesirable noise not only during high speed rotation but also during the acceleration or deceleration of disk rotation, or even during transportation of the apparatus.

Ninth Embodiment

Figure 15:
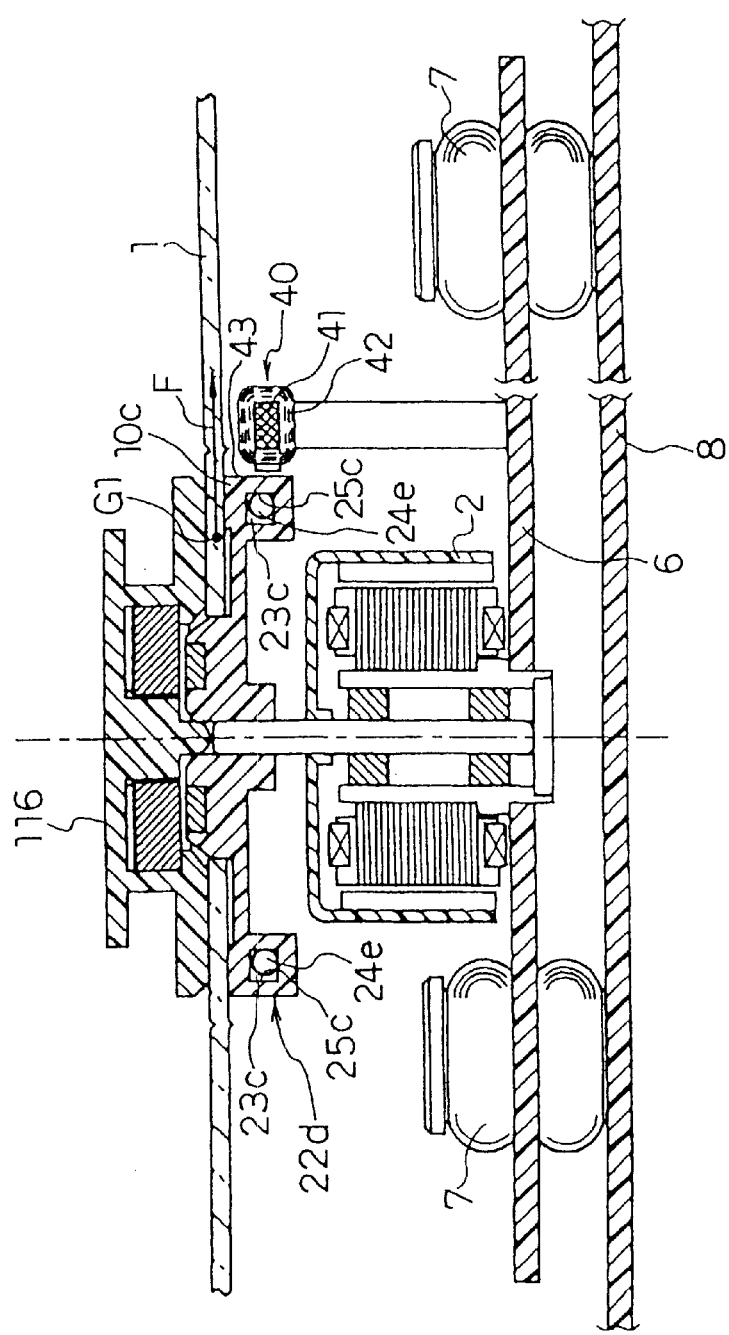
FIG. 15 is a cross-sectional side view showing the vicinity of the spindle motor 2 in a disk drive apparatus according to a ninth embodiment of the present invention.
Figure 16:
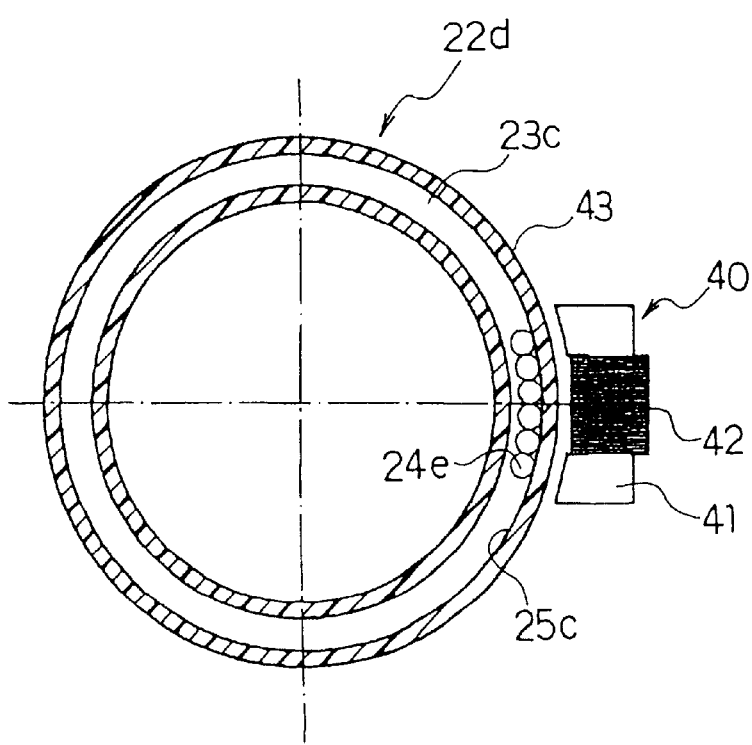
FIG. 16 is a cross-sectional plan view showing the vicinity of a hollow ring member 23 and an electromagnet 40 provided on a turn table 10c in the disk drive apparatus of the ninth embodiment shown in FIG. 14.

Next, a disk drive apparatus according to a ninth embodiment of the present invention will be described with reference to drawing. FIG. 15 is a cross-sectional side view showing the vicinity of the spindle motor 2 in the disk drive apparatus of the ninth embodiment. FIG. 16 is a cross-sectional plan view showing the vicinity only of the hollow ring member 23c provided on the turn table 10c in the disk drive apparatus of the ninth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the ninth embodiment of the present invention, as shown in FIGS. 15 and 16, the hollow ring member 23c is provided on the turn table 10c, and the spherical balancer 22d containing a plurality of magnetic spherical bodies 24e is formed therein. An electromagnet 40 is mounted outside the outer wall 43 of the hollow ring member 23c. The electromagnet 40 consists of an iron core 41 and a coil 42 wound around the center portion of the iron core 41. The iron core 41 is formed with its inside end face facing the outer wall 43 of the hollow ring member 23c with a prescribed gap provided therebetween, and is fixed to the sub-base 6. In other respects, the construction is the same as that of the previously described seventh embodiment.

In the thus constructed ninth embodiment, a magnetic field is created by supplying current through the coil 42, thus exerting an attractive force on the magnetic spherical bodies 24e. With this attractive force, the magnetic spherical bodies 24e are urged in a direction toward the outer circumferential wall 25c of the hollow ring member 23c. Thus, when the disk 1 is stationary, or when the rotational frequency of the disk 1 is low in an early stage of the acceleration process or at the end of the deceleration process, and the centrifugal force acting on the magnetic spherical bodies 24e is small, the magnetic spherical bodies 24e are made to stick to the outer circumferential wall 25c of the hollow ring member 23c by flowing current through the coil 42. The disk drive apparatus of the ninth embodiment can thus prevent the spherical bodies from hitting against each other or against the inner wall surfaces of the hollow ring member 23c.

Further, in the disk drive apparatus of the ninth embodiment, when the disk 1 is rotating at a frequency high enough to generate a centrifugal force that is sufficient to make the magnetic spherical bodies 24e stick to the outer circumferential wall 25c, the current to the coil 42 is cut off. In this way, the magnetic spherical bodies 24e are allowed to move to the position opposite the disk mass center G1, as in the previously described first embodiment.

With this construction of the disk drive apparatus of the ninth embodiment, the magnitude of the attractive force acting on the magnetic spherical bodies 24e can be controlled by controlling the amount of current flown to the coil 42, and also, switching between the attracted state and movable state can be made easily by switching the current to the coil 42 on and off. Therefore, when attraction is necessary, a sufficient current is flown through the coil 42, and thus, the generation of noise by colliding magnetic spherical bodies 24e can be reliably prevented. Moreover, when the disk 1 is rotating at high speed, and the vibration due to the imbalance force increases, the current to the coil 42 is cut off, thereby allowing the magnetic spherical bodies 24e to move to the position opposite the disk mass center G1 so that the vibration suppressing effect can be fully utilized.

As described above, with the construction of the ninth embodiment of the present invention, a disk drive apparatus capable of high speed rotation can be achieved that ensures stable recording or reproducing even when a disk with a greatly unbalanced mass is rotated at high speed, and that does not generate undesirable noise not only during high speed rotation but also during the acceleration or deceleration of disk rotation.

Tenth Embodiment

Figure 17:
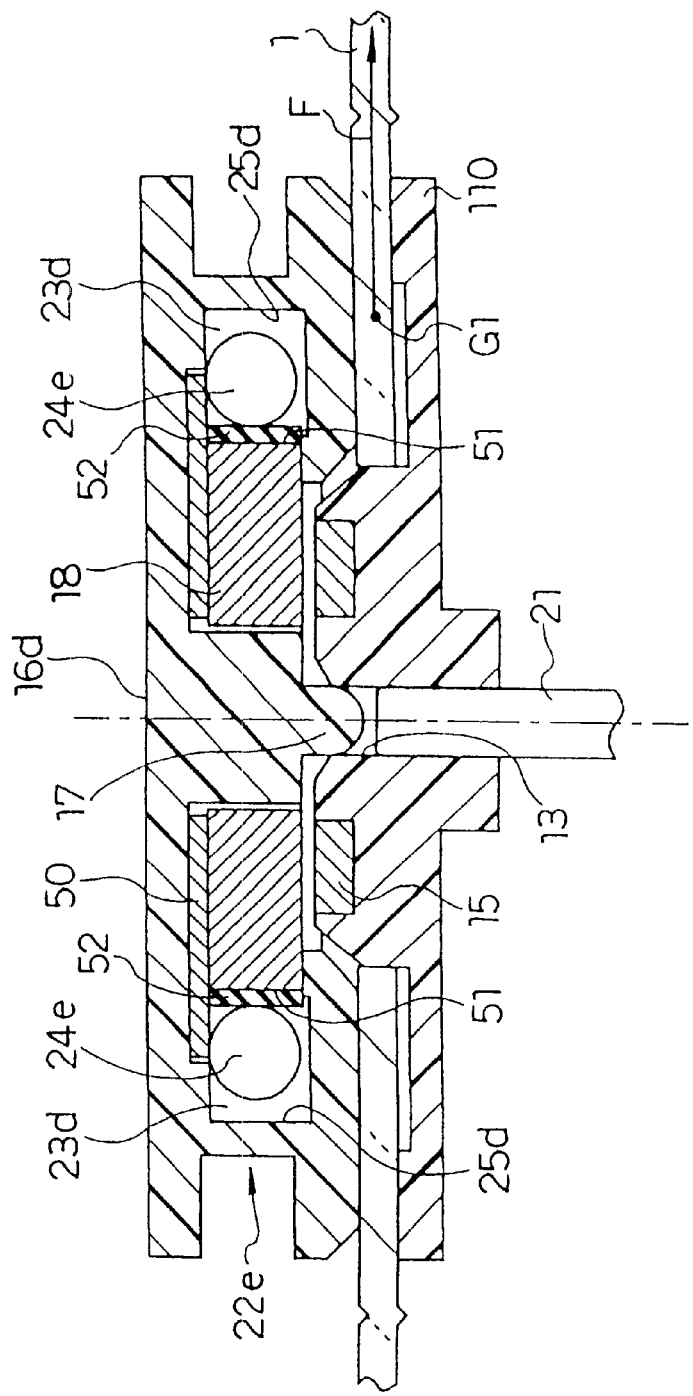
FIG. 17 is a cross-sectional side view showing the vicinity of a turn table 110 in a disk drive apparatus according to a tenth embodiment of the present invention.

Next, a disk drive apparatus according to a tenth embodiment of the present invention will be described with reference to drawing. FIG. 17 is a cross-sectional side view showing the vicinity of the turn table 110 in the disk drive apparatus of the tenth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the tenth embodiment of the present invention, as shown in FIG. 17, the hollow ring member 23d is formed around the outer circumference of a magnet 18 built into the damper 16d, and a plurality of magnetic spherical bodies 24e are contained inside the hollow ring member 23d. The spherical balancer 22e consisting of the hollow ring member 23d and the magnetic spherical bodies 24e is formed integrally with the damper 16d.

As shown in FIG. 17, in the disk drive apparatus of the tenth embodiment, a back yoke 50 is fixed to the upper surface of the magnet 18. The outer radius of the back yoke 50 is formed larger than the outer radius of the magnet 18. An elastic member 52 such as a vibration isolating rubber is attached around the outer circumferential surface 51 of the magnet 18. In other respects, the construction is the same as that of the previously described first embodiment.

In the thus constructed tenth embodiment, the magnetic spherical bodies 24e are attracted and held by utilizing the magnet 18, which generates an attractive force to clamp the disk 1 in position, instead of the magnet 30 in the seventh embodiment shown in FIG. 13.

The magnetic spherical bodies 24e are acted upon by the attractive force from the magnet 18 so that the magnetic spherical bodies 24e are urged at all times in a direction toward the outer circumferential surface 51 of the magnet 18. As a result, when the disk 1 is stationary, or when the rotational frequency of the disk 1 is low, and the centrifugal force acting on the magnetic spherical bodies 24e is small, the magnetic spherical bodies 24e are made to adhere to the elastic member 52 attached around the outer circumferential surface 51 of the magnet 18 by the attractive force of the magnet 18. Accordingly, as in the previously described seventh embodiment, when vibration is applied from the outside during transportation of the disk drive apparatus, or when the disk 1 is in an early stage of the acceleration process or at the end of the deceleration process, the spherical bodies are prevented from hitting against each other or against the inner wall surfaces of the hollow ring member 23d, and generation of undesirable noise can thus be avoided.

The magnet 18 is magnetized in vertical directions in order to generate a sufficient attractive force to clamp the disk 1. Therefore, the magnetic spherical bodies 24e are attracted and held by utilizing the magnetic flux leaking to the side faces of the magnet 18, and the attractive force acting on the magnetic spherical bodies 24e is far smaller than the attractive force acting between the magnet 18 and the counter yoke 15.

On the other hand, if the attractive force acting between the magnet 18 and the counter yoke 15 is made too large, a very large force will be required to overcome the attractive force when unloading the disk 1 from the turn table 110. As a result, the current consumption of the loading motor (not shown) for unloading will have to be increased, and in some case, trouble may occur, such as an inability to unload the disk. Therefore, it is not desirable to increase more than necessary the magnitude of the magnetic field generated by the magnet 18, and if a sufficient attractive force to attract and hold the magnetic spherical bodies 24e is to be obtained from the magnet 18, the magnetic flux leakage to the side walls of the magnet 18 must be utilized to the full.

For this reason, in the disk drive apparatus of the tenth embodiment, the outer radius of the back yoke 50 fixed to the upper surface of the magnet 18 is formed larger than the outer radius of the magnet 18. With this construction of the disk drive apparatus of the tenth embodiment, when the rotational frequency of the disk 1 is low, the magnetic spherical bodies 24e are made to stick securely to the elastic member 52 attached around the outer circumferential surface 51 of the magnet 18. That is, when the rotational frequency of the disk 1 is low, if the magnetic spherical bodies 24e try to come off the elastic member 52 because of centrifugal force, the attractive force continues to act upon the magnetic spherical bodies 24e since magnetic paths are formed from the outer circumferential edges of the back yoke 50 to the bottom surface of the magnet 18 through the magnetic spherical bodies 24e.

Accordingly, in the disk drive apparatus of the tenth embodiment, the magnetic spherical bodies 24e can be attracted and held securely until a high rotational frequency is reached. That is, the disk drive apparatus of the tenth embodiment can securely hold the magnetic spherical bodies 24e attracted to the elastic member 52 until the rotational frequency is reached where a centrifugal force is generated that is sufficient to make the magnetic spherical bodies 24e stick to the outer circumferential wall 25d of the hollow ring member 23d.

When the rotational frequency of the disk 1 is lowered, the magnetic spherical bodies 24e sticking to the outer circumferential wall 25d are drawn to the outer circumferential surface 51 of the magnet 18 by the attractive force of the magnet 18. At this time, since the elastic member 52 is attached around the outer circumferential surface 51 of the magnet 18, the magnetic spherical bodies 24e do not hit directly against the magnet 18, but hit against the elastic member 52 which absorbs the shock. Accordingly, the disk drive apparatus of the tenth embodiment can avoid the generation of undesirable noise as well as trouble due to the shock when stopping the rotation of the disk 1 or when performing recording or reproducing by reducing the rotational frequency of the disk 1.

Furthermore, according to the tenth embodiment of the present invention, since the magnet 18, which generates an attractive force for clamping the disk 1, is utilized to attract and hold the magnetic spherical bodies 24e, there is no need to provide a separate magnet for attracting and holding them, and the number of components can thus be reduced.

Here, the elastic member 52 attached to the magnet 18 may be a cover formed, for example, from a vibration isolating material, or may be formed by coating the outer circumferential surface 51 of the magnet 18 with a vibration isolating material.

As described above, with the construction of the tenth embodiment of the present invention, a disk drive apparatus can be achieved that ensures stable recording or reproducing even when a disk with a greatly unbalanced mass is rotated at high speed, and that does not generate undesirable noise not only during high speed rotation but also during the acceleration or deceleration of disk rotation, or even when performing recording or reproducing by varying the rotational speed as needed.

Eleventh Embodiment

Figure 18:
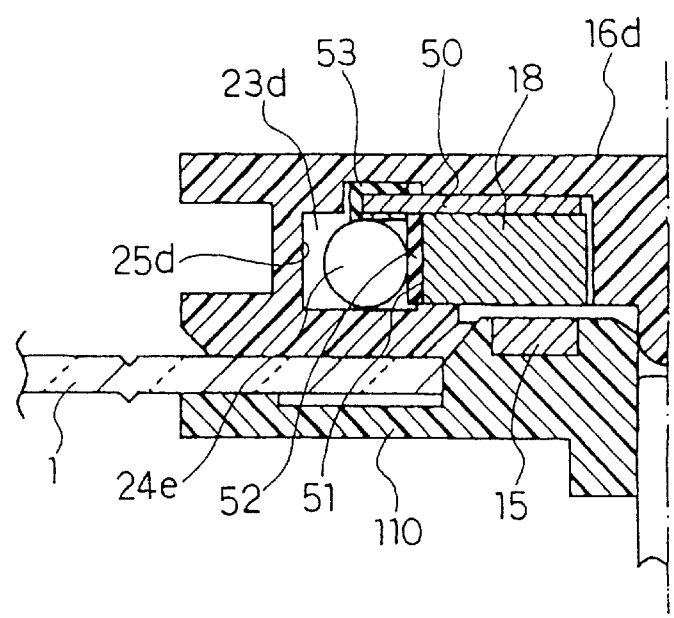
FIG. 18 is an enlarged cross-sectional side view showing the vicinity of the damper 16d and turn table 110 in a disk drive apparatus according to an eleventh embodiment of the present invention.

Next, a disk drive apparatus according to an eleventh embodiment of the present invention will be described with reference to drawing. FIG. 18 is a cross-sectional side view showing the vicinity of the clamper 16d and the turn table 110 in the disk drive apparatus of the eleventh embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the construction of the foregoing tenth embodiment, the elastic member 52 formed from a vibration isolating rubber or the like was attached around the outer circumferential surface 51 of the magnet 18; in the disk drive apparatus of the eleventh embodiment of the present invention, on the other hand, an elastic member 53 formed from a vibration isolating rubber or the like is also attached around the end faces and lower surface portions of the back yoke 50 protruding outward of the outer circumferential surface 51 of the magnet 18. In other respects, the construction is the same as that of the foregoing tenth embodiment.

In the thus constructed disk drive apparatus of the eleventh embodiment, since the elastic member 53 is also provided on the back yoke 50, the occurrence of undesirable noise and trouble due to shock can be avoided.

Even when the rotational frequency of the disk 1 is lowered during deceleration of the disk rotation, and the magnetic spherical bodies 24e are drawn to the outer circumferential surface 51 of the magnet 18 by the attractive force of the magnet 18, if the magnetic spherical bodies 24e hit against the end faces or lower surface portions of the back yoke 50, not against the elastic member 52 attached around the outer circumferential surface 51 of the magnet 18, the occurrence of undesirable noise and trouble due to shock can be avoided.

When the disk 1 is placed in a horizontal position, there is little possibility of the magnetic spherical bodies 24e hitting against the back yoke 50 because of the force of gravity, but, in particular, when the disk 1 is held in a vertical position, in the disk drive apparatus placed longitudinally, there aries the possibility that the magnetic spherical bodies 24e will be drawn toward the back yoke 50.

As described above, with the construction of the eleventh embodiment of the present invention, an excellent disk drive apparatus can be achieved that ensures stable recording or reproducing even when a disk with a greatly unbalanced mass is rotated at high speed, and that does not generate undesirable noise regardless of whether the disk drive apparatus is set in a horizontal position or a vertical position.

Twelfth Embodiment

Figure 19:
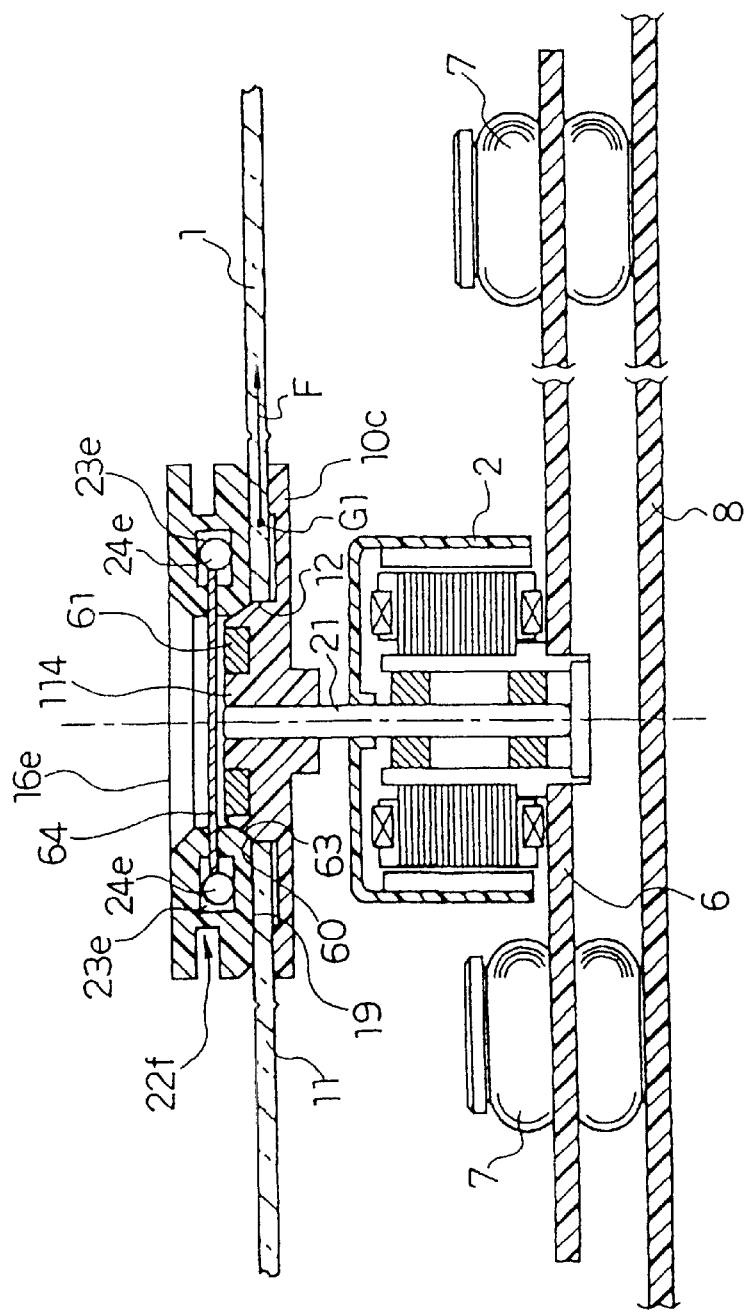
FIG. 19 is a cross-sectional side view showing the vicinity of the spindle motor 2 in a disk drive apparatus according to a twelfth embodiment of the present invention.

Next, a disk drive apparatus according to a twelfth embodiment of the present invention will be described with reference to drawing. FIG. 19 is a cross-sectional side view showing the vicinity of the spindle motor 2 in the disk drive apparatus of the twelfth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the twelfth embodiment of the present invention, the turn table 10c, which supports the clamp area 11 of the disk 1 in rotatable fashion, is fixed to the spindle shaft 21 of the spindle motor 2, as shown in FIG. 19. Further, a positioning taper 60 is formed on the side faces of the boss 114 of the turn table 10c, and a ring-shaped magnet 61 is embedded inside it.

In the damper 16e, there is formed a tapered hole 63 for centering the damper 16e by engaging on the positioning taper 60 formed on the turn table 10c. A ring-shaped counter yoke 64 is fixed to the upper portion of the tapered hole 63.

A flat contacting portion 19 which contacts the disk 1 is formed on the lower surface of the clamper 16e. Further, the clamper 16e is provided with a hollow ring member 23e concentric with the center axis of the tapered hole 63. Inside the hollow ring member 23e are contained a plurality of magnetic spherical bodies 24e in movable fashion, and a spherical balancer 22f comprising of the hollow ring member 23e and the magnetic spherical bodies 24e is formed integrally with the damper 16e.

When the disk 1 is clamped by the damper 16e, the disk 1 is centered and held on the turn table 10c with the clamp hole 12 in the disk 1 engaging on the boss 114 of the turn table 10c. Then, the disk 1 is clamped in position by the attractive force acting between the counter yoke 64 fixed to the damper 16e and the magnet 61 fixed to the turn table 10c. At this time, since positioning is done with the tapered hole 63 formed in the clamper 16e engaging on the positioning taper 60 provided on the turn table 10c, the hollow ring member 23e provided concentrically with the center axis of the tapered hole 63 is positioned substantially concentric with the rotational center axis P0 of the spindle motor 2. The damper 16e with the disk 1 clamped in this way is driven by the spindle motor 2 for rotation in integral fashion with the disk 1 and the turn table 10c.

Further, as in the previously described first embodiment, the disk drive apparatus of the twelfth embodiment uses a low-stiffness insulator (elastic member) 7 to join the sub-base 6 to the main base 8. In the disk drive apparatus of the twelfth embodiment, the primary resonance frequency in a direction parallel to the recording surface of the disk 1 in the mechanical vibration of the sub-base 6 due to the deformation of the insulator 7 is set at about 60 Hz, which is lower than the rotational frequency of the disk 1 (about 100 Hz).

In the thus constructed twelfth embodiment, when a disk 1 with a large unbalance amount is rotated at about 100 Hz, the magnetic spherical bodies 24e are concentrated in a position substantially diametrically opposite the disk mass center G1 by the moving force R, as in the previously described first embodiment shown in FIG. 2. As a result, the imbalance force F acting on the disk mass center G1 is offset by the centrifugal force Q acting on the magnetic spherical bodies 24e, and the vibration of the sub-base 6 is thus suppressed.

In the disk drive apparatus of the twelfth embodiment, the magnetic spherical bodies 24e are acted upon by the attractive force arising from the leakage magnetic flux from the counter yoke 64 and the magnet 61, so that the magnetic spherical bodies 24e are urged at all times in a direction toward the outer end faces of the counter yoke 64. Accordingly, when the disk 1 is stationary, or when the rotational frequency of the disk 1 is low and the centrifugal force acting on the magnetic spherical bodies 24e is small, the magnetic spherical bodies 24e are made to stick to the outer end faces of the counter yoke 64 by the attractive force from the counter yoke 64.

As described above, in the disk drive apparatus of the twelfth embodiment, as in the previously described seventh embodiment, the spherical bodies are prevented from hitting against each other or against the inner wall surfaces of the hollow ring member 23e when vibration is applied from the outside during transportation of the disk drive apparatus or when the disk 1 is in an early stage of the acceleration process or at the end of the deceleration process, and in this way, the occurrence of undesirable noise can be avoided.

As described above, in the disk drive apparatus of the twelfth embodiment of the present invention, a disk loading mechanism is provided which consists of the damper 16e provided with the counter yoke 64 and the turn table 10c provided with the magnet 61. Using such a disk loading mechanism also, a disk drive apparatus can be achieved that ensures stable recording or reproducing even when a disk 1 with a greatly unbalanced mass is rotated at high speed, and that prevents the generation of undesirable noise.

Thirteenth Embodiment

Figure 20:
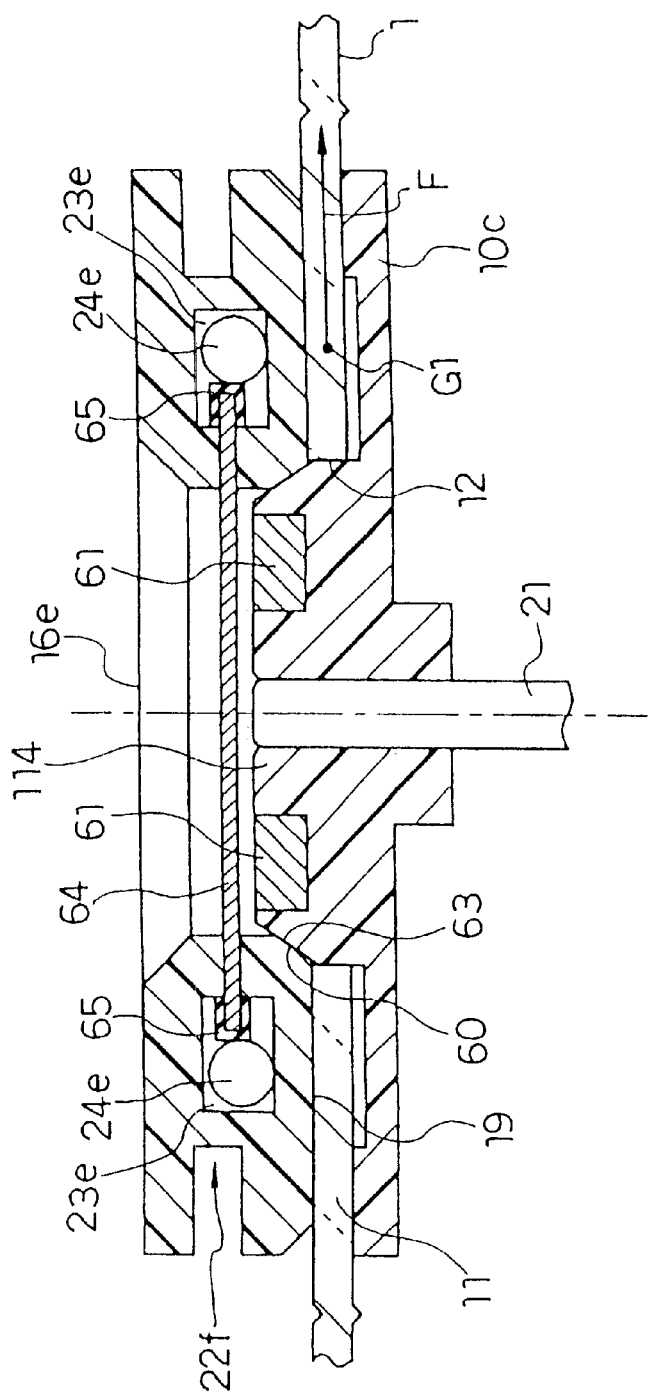
FIG. 20 is a cross-sectional side view showing the vicinity of the turn table 10c in a disk drive apparatus according to a thirteenth embodiment of the present invention.

Next, a disk drive apparatus according to a thirteenth embodiment of the present invention will be described with reference to drawing. FIG. 20 is a cross-sectional side view showing the vicinity of the turn table 10c in the disk drive apparatus of the thirteenth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the thirteenth embodiment of the present invention, as shown in FIG. 20, an elastic member 65 formed from a vibration isolating rubber or the like is attached around the circumference of the counter yoke 64 shown in the construction of the foregoing twelfth embodiment. In other respects, the construction is the same as that of the foregoing twelfth embodiment.

In the thus constructed thirteenth embodiment, when the rotational frequency of the disk 1 is lowered during deceleration of the disk rotation, and the magnetic spherical bodies 24e are drawn to the outer end faces of the counter yoke 64 by the attractive force from the counter yoke 64, the provision of the elastic member 65 on the counter yoke 64 serves to prevent the magnetic spherical bodies 24e from hitting directly against the counter yoke 64; the magnetic spherical bodies 24e instead hit against the elastic member 65 which absorbs the shock, and the magnetic spherical bodies 24e are thus made to stick to the elastic member 65. In this way, the generation of undesirable noise and trouble due to the shock can be avoided.

As described above, in the disk drive apparatus of the thirteenth embodiment of the present invention, a disk loading mechanism is provided which comprises of the damper 16e provided with the counter yoke 64 and the turn table 10c provided with the magnet 61. Using such a disk loading mechanism also, a disk drive apparatus can be achieved that ensures stable recording or reproducing even when a disk 1 with a greatly unbalanced mass is rotated at high speed, and the generation of undesirable noise can be prevented reliably.

Fourteen Embodiment

Figure 21:
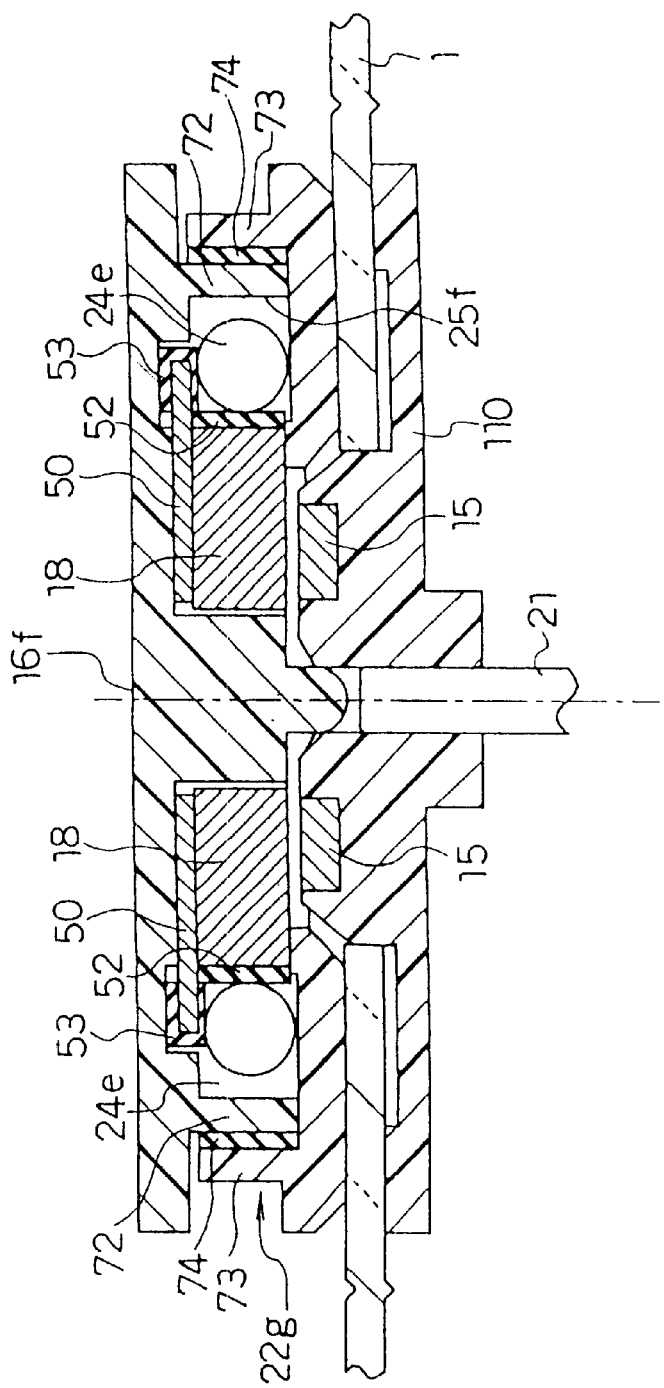
FIG. 21 is a cross-sectional side view showing the vicinity of the turn table 110 in a disk drive apparatus according to a fourteenth embodiment of the present invention.

Next, a disk drive apparatus according to a fourteenth embodiment of the present invention will be described with reference to drawing. FIG. 21 is a cross-sectional side view showing the vicinity of the turn table 110 in the disk drive apparatus of the fourteenth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the fourteenth embodiment of the present invention, the damper 16f comprises an upper case 70 and a lower case 71, as shown in FIG. 21. The upper case 70 and the lower case 71 are assembled together with the outer circumferential side wall 73 of the lower case 71 positioned outside the outer circumferential side wall 72 of the upper case 70. An elastic member 74 is sandwiched between the outer circumferential side wall 72 of the upper case 70 and the outer circumferential side wall 73 of the lower case 71 in intimately contacting relationship.

As shown in FIG. 21, the hollow ring member 23f is formed by an upper inner surface of the upper case 70 of the damper 16f, an inner surface of the outer circumferential side wall 72, a bottom inner surface of the lower case 71, and an outer circumferential surface of the magnet 18, and a plurality of magnetic spherical bodies 24e are contained inside the hollow ring member 23f. In this way, in the disk drive apparatus of the fourteenth embodiment, a spherical balancer 22g consisting of the hollow ring member 23f and the magnetic spherical bodies 24e is formed integrally with the damper 16f.

Further, in the disk drive apparatus of the fourteenth embodiment, the back yoke 50 is fixed to the upper surface of the magnet 18, and the elastic member 53 is attached rigidly to the back yoke 50, as in the previously described eleventh embodiment. Furthermore, the elastic member 52 is attached rigidly to the outer circumferential surface 51 of the magnet 18. In other respects, the construction is the same as that of the previously described first embodiment.

In the thus constructed disk drive apparatus of the fourteenth embodiment, when the disk 1 is stationary, or when the rotational frequency of the disk 1 is low during acceleration or deceleration, and the centrifugal force acting on the magnetic spherical bodies 24e is small, the magnetic spherical bodies 24e are made to stick to the elastic member 52 or the elastic member 53 by the attractive force of the magnet 18, as in the previously described eleventh embodiment. In this condition, when the rotation of the disk 1 is accelerated and the rotational frequency increases to the point where the centrifugal force acting on the magnetic spherical bodies 24e exceeds the attractive force of the magnet 18, the magnet spherical bodies 24e sticking to the elastic member 52 or the elastic member 53 are thrown toward the outer circumferential wall 25f and hit against the outer circumferential wall 25f.

When fs denotes the rotational frequency that causes the magnetic spherical bodies 24e to be thrown toward the outer circumferential wall 25f, fh denotes the rotational frequency that generates a centrifugal force sufficient to hold the magnetic spherical bodies 24e adhering to the outer circumferential wall 25f, and fn denotes the rotational frequency where the vibration caused by the unbalance of the disk 1 becomes undesirably large, it is desirable that the relation between them be set as fh<fs<fn, as in the previously described seventh embodiment. That is, it is desirable that the attractive force of the magnet 18 be increased and fs be set sufficiently higher than fh so that the magnetic spherical bodies 24e can be attracted and held securely even if vibration or shock is applied from the outside when the rotational frequency of the disk 1 is lower than fh. However, the higher the fs is set, the higher the speed at which the magnetic spherical bodies 24e collide against the outer circumferential wall 25f, and there arises the possibility that the shock caused by the collision of the magnetic spherical bodies 25e is transmitted to the disk 1, causing the disk 1 to vibrate and adversely affecting recording or reproducing operations, or increasing the colliding noise to an undesirable level.

To address this, in the disk drive apparatus of the fourteenth embodiment, the elastic member 74 is sandwiched between the outer circumferential wall 72 of the upper case 70 and the outer circumferential wall 73 of the lower case 71. With the damping effect of the elastic member 74, the shock caused when the magnetic spherical bodies 24e collide against the outer circumferential wall 25f is absorbed, preventing the shock from being transmitted to the disk 1, while reducing the magnitude of the colliding noise. Accordingly, even if the attractive force of the magnet 18 acting on the magnetic spherical bodies 24e is increased so that the magnetic spherical bodies 24e can be attracted and held securely when the rotational frequency of the disk 1 is low, the occurrence of trouble can be prevented, avoiding situations where adverse effects are caused to recording or reproducing operations by the shock when the magnetic spherical bodies 24e collide against the outer circumferential wall 25f during the acceleration of the rotation of the disk 1, or where the colliding noise increases to an undesirable level.

As described above, with the construction of the fourteenth embodiment of the present invention, a disk drive apparatus can be achieved that ensures stable recording or playback even when a disk with a greatly unbalanced mass is rotated at high speed, and that prevents the generation of undesirable noise even if vibration or shock is applied to the disk drive apparatus when the disk is stationary or is rotating at slow speed.

Fifteenth Embodiment

Figure 22:
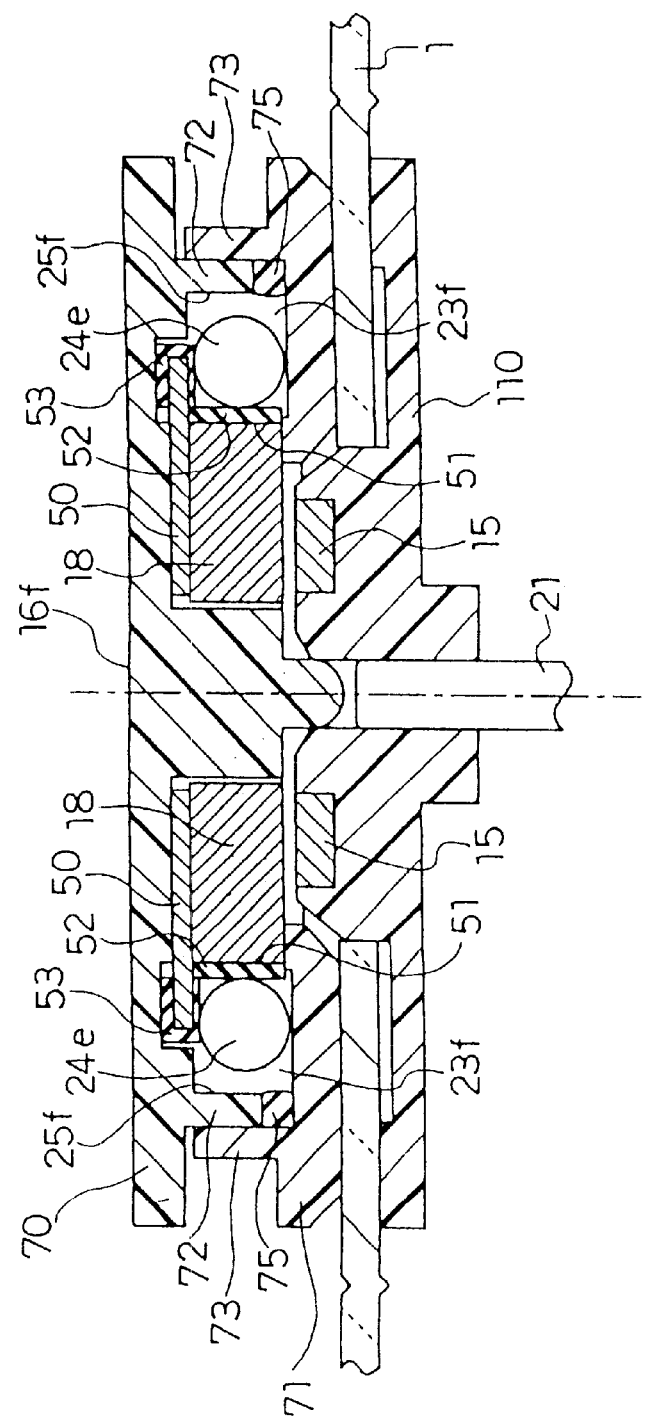
FIG. 22 is a cross-sectional side view showing the vicinity of the turn table 110 in a disk drive apparatus according to a fifteenth embodiment of the present invention.

Next, a disk drive apparatus according to a fifteenth embodiment of the present invention will be described with reference to drawing. FIG. 22 is a cross-sectional side view showing the vicinity of the turn table 110 in the disk drive apparatus of the fifteenth embodiment. Here, elements essentially identical to those in the disk drive apparatus of the first and second embodiments or to those in the disk drive apparatus shown in FIGS. 24 and 25 are designated by the same reference numerals, and descriptions of such elements are omitted.

As in the foregoing fourteenth embodiment, in the fifteenth embodiment of the present invention shown in FIG. 22, the hollow ring member 23f is formed by the upper inner surface of the upper case 70, the inner surface of the outer circumferential side wall 72, the bottom inner surface of the lower case 71, and the outer circumferential surface of the magnet 18. As shown in FIG. 22, in the disk drive apparatus of the fifteenth embodiment, an elastic member 75 is sandwiched between the lower end portion of the outer circumferential side wall 72 of the upper case 70 and the bottom inner surface of the lower case 71 in intimately contacting relationship. In other respects, the construction is the same as that of the foregoing fourteenth embodiment.

In the thus constructed disk drive apparatus of the fifteenth embodiment, as in the foregoing fourteenth embodiment, the vibration of the outer circumferential side wall 72 caused when the magnetic spherical bodies 24e collide against the outer circumferential wall 25f is damped with the vibration damping effect of the elastic member 75 sandwiched between the lower end portion of the outer circumferential side wall 72 of the upper case 70 and the bottom upper surface of the lower case 71, thus preventing the vibration from being transmitted to the disk 1, while reducing the magnitude of the colliding noise. Accordingly, even when the attractive force of the magnet 18 is increased to such a level that the magnetic spherical bodies 24e can be attracted and held securely even if vibration or shock is applied to the disk drive apparatus when the disk is stationary or is rotating at slow speed, the occurrence of trouble can be prevented, avoiding situations where adverse effects are caused to recording or reproducing operations by the shock when the magnetic spherical bodies 24e collide against the outer circumferential wall 25f, or where the colliding noise increases to an undesirable level.

Furthermore, in the disk drive apparatus of the fifteenth embodiment, the upper case 70 and lower case 71 of the clamper 16f can be easily assembled comparison with the disk drive apparatus of the foregoing fourteenth embodiment. This is because in the disk drive apparatus of the fifteenth embodiment, the absence of the elastic member 74 between the outer circumferential side wall 72 of the upper case 70 and the outer circumferential side wall 73 of the lower case 71 makes it possible to assemble the cases by pressing the lower end portion of the outer circumferential side wall 72 of the upper case 70 against the elastic member 75 on the bottom upper surface of the lower case 71.

As described above, with the construction of the fifteenth embodiment of the present invention, as in the foregoing fourteenth embodiment, a disk drive apparatus can be achieved that ensures stable recording or reproducing even when a disk with a greatly unbalanced mass is rotated at high speed, and that prevents the generation of undesirable noise even if vibration or shock is applied to the disk drive apparatus when the disk is stationary or is rotating at slow speed.

Sixteenth Embodiment

Figure 23:
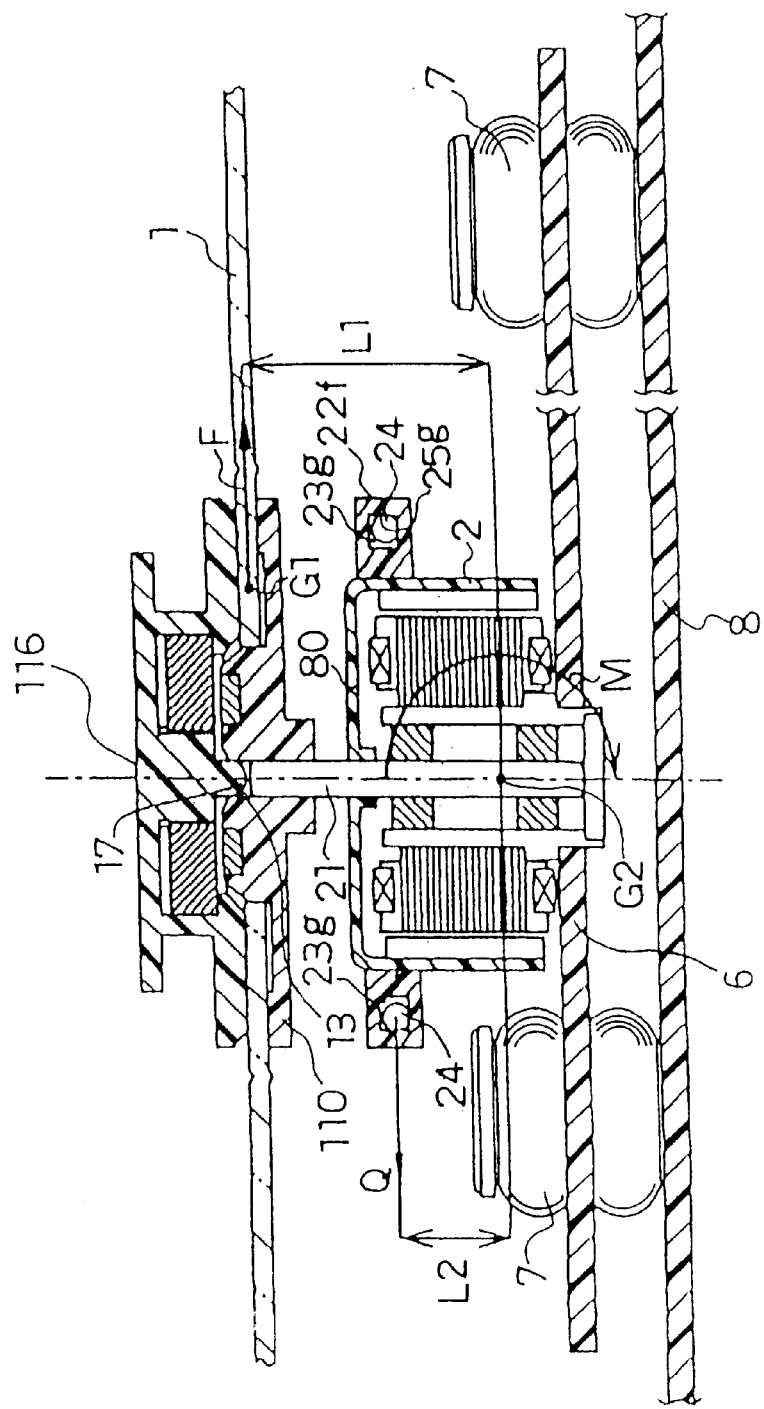
FIG. 23 is a cross-sectional side view showing the vicinity of the spindle motor 2 in a disk drive apparatus according to a sixteenth embodiment of the present invention.

Next, a disk drive apparatus according to a sixteenth embodiment of the present invention will be described with reference to drawing. FIG. 23 is a cross-sectional side view showing the vicinity of the spindle motor 2 in the disk drive apparatus according to the sixteenth embodiment of the present invention. Here, elements essentially identical to those in the disk drive apparatus of the first and second embodiments or to those in the disk drive apparatus shown in FIGS. 24 and 25 are designated by the same reference numerals, and descriptions of such elements are omitted.

In the disk drive apparatus of the sixteenth embodiment of the present invention, the hollow ring member 23g is provided on the rotor 80 of the spindle motor 2. Inside the hollow ring member 23g of the sixteenth embodiment are contained a plurality of spherical bodies 24 in movable fashion, and the hollow ring member 23g and the spherical bodies 24 together constitute a spherical balancer 22f. The damper 116 and the turn table 110 are the same as those used in the conventional disk drive apparatus; in other respects, the construction is the same as that of the previously described first embodiment.

As in the case of the previously described first embodiment (FIG. 1), fourth embodiment (FIG. 10), and seventh embodiment (FIG. 13), the sixteenth embodiment aims at solving the problem that the center axis P2 of the outer circumferential wall 25g of the hollow ring member 23g becomes displaced from the rotational center axis P0 of the spindle motor, and by managing the concentricity of the hollow ring member 23g with respect to the rotational center axis P0 of the spindle motor in advance, a stable effect of the spherical balancer 22f can be obtained consistently. In the sixteenth embodiment, the same effect can be obtained if a liquid 26, instead of the spherical bodies 24, is sealed inside the hollow ring member 23g provided on the rotor 80.

As in the disk drive apparatus of the sixteenth embodiment of the present invention shown in FIG. 23, the hollow ring member 23g containing the plurality of spherical bodies 24 in movable fashion is provided spaced apart from an unbalanced disk 1 in the direction of the rotational axis P0 of the spindle motor 2. In this case, the center of mass of the sub-base 6 and the entire component assembly mounted on the sub-base 6 is denoted by G2. When the moment F·L1 about the center of mass G2 of the entire component assembly due to the imbalance force acting on the center of mass G1 of the disk 1 is compared with the moment Q·L2 about the center of mass G2 due to the centrifugal force Q acting on the spherical bodies 24 clustered in the position directly opposite to the direction of the imbalance force F, if the centrifugal force Q and the imbalance force F are equal in magnitude, the moment F·L1 of the unbalance force F is larger because L1 is larger than L2. The sub-base 6 generates rotational vibrations due to their resultant moment M. Therefore, in cases where rotational vibrations become a problem, if the hollow ring member 23 is provided on an element near the disk 1, for example, on the damper 116 or the turn table 110, and the spherical bodies 24 or the liquid 26 is placed therein, the difference between the moment F·L1 and the moment Q·L2 can be reduced.

Further, if there is a limitation on the size of the hollow ring member 23g, and the mass of the spherical bodies 24 or liquid 26 to be contained in the hollow ring member 23g cannot be made sufficiently large, or if the unbalance amount. of the disk 1 is extremely large, the centrifugal force Q becomes smaller than the imbalance force F, increasing the difference between the moment F·L1 and the moment Q·L2. In such cases, however, distance L2 between the points of action of the center of mass G2 and the centrifugal force Q is made larger by forming the hollow ring member, for example, on the upper part of the damper 116. In this way, the difference between the moment F·L1 and the moment Q·L2 can be reduced, reducing the resultant moment M. Accordingly, even in cases where the vibration in the direction parallel to the disk surface of the disk 1 cannot be suppressed sufficiently, the rotational vibration due to the resultant moment M can be reduced.

In the first to sixteenth embodiments, the operation and effect have been described when an unbalance is contained in the disk 1, but if there is an unbalance in any member driven for rotation by the spindle motor 2, such as the turn table 110, the rotor of the spindle motor 2, or the damper 116, the effect of suppressing the vibration due to that unbalance can also be obtained.

As described above, according to the disk drive apparatus of the present invention, by providing a balancer containing a plurality of spherical bodies or a liquid so as to be rotatable in integral fashion with a disk the vibration of the sub-base due to disk imbalance can be suppressed reliably, and a disk drive apparatus can be achieved that ensures stable recording or reproducing even when an unbalanced disk is rotated at high speed, and that is quiet in operation, has excellent anti-vibration, anti-shock characteristics, and is capable of high-speed data transfer.

INDUSTRIAL APPLICABILITY

The disk drive apparatus of the present invention suppresses vibrations due to mass imbalance of a disk or the like, and the present invention can be applied to every kind of disk drive apparatus that records data on a disk or play back data recorded on a disk while rotating the disk. For example, by applying the technological concept of the present invention to a playback-only optical disk drive apparatus for CD, CD-ROM, etc. or to a recordable apparatus that requires more precise relative distance control between the optical head and track on the disk (tracking control), a more reliable apparatus can be achieved.

Furthermore, undesirable vibrations due to disk imbalance can be suppressed not only in an apparatus that performs non-contacting recording or reproducing using an optical head, but also in an apparatus that performs recording or reproducing on a disk using a contact-type magnetic head or floating-type magnetic head.

What is claimed is:

1. An optical disk drive apparatus for recording or reproducing an interchangeable optical disk loaded by a user, the optical disk drive apparatus comprising:
   a turn table on which said interchangeable optical disk is placed by the user and which rotatably supports said interchangeable optical disk;
   a balancer having a hollow ring member containing therein a rotatable balancing member, the balancing member always being free to move with respect to the hollow ring member; and
   a clamper, which is formed integrally with said balancer and which has a rotational center axis positioned substantially concentrically with a center axis of said hollow ring member, for clamping said interchangeable optical disk onto said turn table,
   wherein said balancer reduces vibration due to imbalance of said interchangeable optical disk loaded by the user.

2. An optical disk drive apparatus for recording or reproducing an interchangeable optical disk loaded by a user, the optical disk drive apparatus comprising:
   a balancer having a hollow ring member containing therein a rotatable balancing member, the balancing member always being free to move with respect to the hollow ring member; and
   a turn table, on which said interchangeable optical disk is placed by the user and which rotatably supports said disk, said turn table being formed integrally with said balancer and having a rotational center axis positioned substantially concentrically with a center axis of said hollow ring member,
   wherein said balancer reduces vibration due to imbalance of said interchangeable optical disk loaded by the user.

3. An optical disk drive apparatus for recording or reproducing an interchangeable optical disk loaded by a user, the optical disk drive apparatus comprising:
   a balancer having a hollow ring member containing therein a rotatable balancing member, the balancing member always being free to move with respect to the hollow ring member; and
   a spindle motor, having a rotor formed integrally with said balancer and which has a rotational center axis positioned substantially concentrically with a center axis of said hollow ring member, for rotationally driving said interchangeable optical disk loaded by the user,
   wherein said balancer reduces vibration due to imbalance of said interchangeable optical disk loaded by the user.

4. An optical disk drive apparatus for recording or reproducing an interchangeable optical disk loaded by a user, the optical disk drive apparatus comprising:
   a balancer having a hollow ring member containing therein a rotatable balancing member, the balancing member always being free to move with respect to the hollow ring member; and
   a spindle motor, having a spindle shaft provided integrally with said balancer and which has a rotational center axis positioned substantially concentrically with a center axis of said hollow ring member, for rotationally driving said interchangeable optical disk loaded by the user,
   wherein said balancer reduces vibration due to imbalance of said interchangeable optical disk loaded by the user.

5. An optical disk drive apparatus for recording or reproducing an interchangeable optical disk loaded by a user, the optical disk drive apparatus comprising:
   a balancer mounted rotatably with a loaded interchangeable optical disk and having a hollow ring member containing therein a balancing member, the balancing member always being free to move with respect to the hollow ring member,
   wherein said interchangeable optical disk is driven for rotation at a frequency higher than the primary resonance frequency of wobbling vibrations of said interchangeable optical disk loaded by the user, and
   said balancer reducing vibration due to imbalance of said interchangeable optical disk loaded by the user.

6. An optical disk drive apparatus for recording or reproducing an interchangeable optical disk loaded by a user, the optical disk drive apparatus comprising:
   a sub-base to which a spindle motor for rotationally driving said interchangeable optical disk is fixed;
   a main base on which said sub-base is mounted via an elastic member having a function of absorbing vibration or impact from the outside; and
   a balancer which is mounted rotatably with said interchangeable optical disk and having a hollow ring member containing therein a balancing member and having a rotational axis positioned substantially concentrically with a rotational center axis of said spindle motor, the balancing member always being free to move with respect to the hollow ring member,
   wherein said interchangeable optical disk is rotated at a frequency higher than the primary resonance frequency of said sub-base due to deformation of said elastic member in a mechanical vibration in a direction containing a plane parallel to a recording surface of said interchangeable optical disk loaded by the user, and
   said balancer reducing vibration due to imbalance of said interchangeable optical disk loaded by the user.

7. An optical disk drive apparatus for recording or reproducing an interchangeable optical disk loaded by a user, the optical disk drive apparatus comprising:
   a turn table, having a positioning hole engaging with a spindle shaft of a disk rotational driving spindle motor, for mounting thereon said interchangeable optical disk, and for supporting said interchangeable optical disk in rotatable fashion;
   a clamper, having a center axis engaging with said positioning hole, for clamping said interchangeable optical disk in collaboration with said turn table; and
   a balancer having a hollow ring member containing therein a balancing member and having a center axis positioned concentrically with the rotational center axis of said clamper, said balancer being formed integrally with said clamper, the balancing member always being free to move with respect. to the hollow ring member,
   wherein said balancer reduces vibration due to imbalance of said interchangeable optical disk loaded by the user.

8. An optical disk drive apparatus for recording or reproducing an interchangeable optical disk loaded by a user, the optical disk drive apparatus comprising:
   a balancer having a center hole engaging with a spindle shaft of a disk rotational driving spindle motor, and provided with a hollow ring member containing therein a balancing member and mounted concentrically with said center hole, the balancing member always being free to move with respect to the hollow ring member, wherein said balancer reduces vibration due to imbalance of said interchangeable optical disk loaded by the user.

9. A turn table for an optical disk drive apparatus for recording or reproducing an interchangeable optical disk loaded by a user, said turntable for mounting thereon said interchangeable optical disk, and for rotatably supporting said interchangeable optical disk, said turn table being provided with a balancer formed integral therewith and having a hollow ring member containing therein a rotatable balancing material, and having a rotational center axis positioned substantially concentrically with a center axis of said hollow ring member, the balancing material always being free to move with respect to the hollow ring member, wherein said balancer reduces vibration due to imbalance of said interchangeable optical disk loaded by the user.

* * * * *